(12) United States Patent
Tatsuno et al.

(10) Patent No.: US 10,452,103 B2
(45) Date of Patent: Oct. 22, 2019

(54) DOCKING DEVICE

(71) Applicant: LENOVO (SINGAPORE) PTE. LTD., Singapore (SG)

(72) Inventors: Kazuya Tatsuno, Kanagawa (JP); Hiroaki Agata, Kanagawa (JP); Yoshiyuki Shibayama, Kanagawa (JP); Tetsuo Ogawa, Kanagawa (JP); Toshihiro Inoue, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/138,821

(22) Filed: Sep. 21, 2018

(65) Prior Publication Data

US 2019/0094907 A1    Mar. 28, 2019

(30) Foreign Application Priority Data

Sep. 22, 2017 (JP) ................................. 2017-182217
Jun. 7, 2018 (JP) ................................. 2018-109231

(51) Int. Cl.
*G06F 1/16* (2006.01)
*H01R 13/44* (2006.01)
*H01R 13/639* (2006.01)

(52) U.S. Cl.
CPC ............ *G06F 1/1632* (2013.01); *G06F 1/166* (2013.01); *G06F 1/1616* (2013.01); *H01R 13/44* (2013.01); *H01R 13/639* (2013.01)

(58) Field of Classification Search
USPC ................................................... 361/679.43
See application file for complete search history.

(56) References Cited

U.S. PATENT DOCUMENTS

| 5,030,128 A * | 7/1991 | Herron ................. | G06F 1/1632 361/679.43 |
| 6,115,246 A * | 9/2000 | Ohnishi ................ | G06F 1/1632 361/679.43 |
| 6,556,436 B2 * | 4/2003 | Ohnishi ................ | G06F 1/1632 361/679.41 |
| 6,898,079 B2 * | 5/2005 | Park ..................... | G06F 1/1632 361/679.43 |

(Continued)

FOREIGN PATENT DOCUMENTS

JP    2017-170380 A    9/2014

*Primary Examiner* — Lisa Lea-Edmonds
(74) *Attorney, Agent, or Firm* — Anthony P. Ng; Russell Ng PLLC

(57) ABSTRACT

A docking device is provided. The docking device includes an engaging member that projects from an upper surface of a device chassis, which has a hook portion for engaging with and disengage from an engaging hole of a portable information apparatus, and which is movable between an engagement position at which the hook portion engages with the engaging hole and a disengagement position at which the engagement of the hook portion with the engaging hole is released; and a restricting member that is movable between a retraction position at which the engaging member is allowed to move from the engagement position to the disengagement position and a restriction position at which the movement of the engaging member from the engagement position to the disengagement position is restricted by coming in contact with the engaging member at a rear surface of the hook portion.

19 Claims, 13 Drawing Sheets

(56) References Cited

U.S. PATENT DOCUMENTS

| | | | |
|---|---|---|---|
| 6,934,151 B2* | 8/2005 | Nakano | G06F 1/1632 361/679.43 |
| 7,038,908 B2* | 5/2006 | Usui | G06F 1/1632 361/679.41 |
| 7,142,421 B2* | 11/2006 | Cheng | G06F 1/1632 361/679.57 |
| 7,381,079 B2* | 6/2008 | Chuang | G06F 1/1632 361/679.41 |
| 10,007,298 B2* | 6/2018 | Shibayama | G06F 1/1616 |
| 2002/0105783 A1* | 8/2002 | Kitahara | G06F 1/1632 361/695 |
| 2003/0128506 A1* | 7/2003 | Won | E05B 73/0082 361/679.57 |
| 2003/0202323 A1* | 10/2003 | Maeda | E05B 73/0082 361/679.41 |
| 2004/0080909 A1* | 4/2004 | Kitahara | G06F 1/1632 361/679.48 |
| 2004/0120112 A1* | 6/2004 | Mullen | E05B 73/0082 361/679.41 |
| 2005/0047104 A1* | 3/2005 | Grunow | G06F 1/1632 361/801 |
| 2005/0128687 A1* | 6/2005 | Liang | G06F 1/1632 361/679.57 |
| 2005/0146849 A1* | 7/2005 | Mullen | E05B 73/0082 361/679.57 |
| 2006/0126290 A1* | 6/2006 | Park | G06F 1/1632 361/679.41 |
| 2010/0002371 A1* | 1/2010 | Lee | G06F 1/1632 361/679.44 |
| 2010/0265652 A1* | 10/2010 | Agata | G06F 1/1632 361/679.41 |
| 2012/0218722 A1* | 8/2012 | Yu | F16M 11/041 361/747 |
| 2014/0153162 A1* | 6/2014 | Kim | G06F 1/1632 361/679.01 |
| 2014/0285963 A1* | 9/2014 | Vasilevsky | G06F 1/1632 361/679.43 |
| 2016/0209872 A1* | 7/2016 | Vasilevsky | G06F 1/1632 |
| 2018/0373290 A1* | 12/2018 | Ogawa | G06F 1/1632 |
| 2019/0011951 A1* | 1/2019 | Shibayama | G06F 1/1632 |

* cited by examiner

DOCKING DEVICE

PRIORITY CLAIM

The present application claims benefit of priority under 35 U.S.C. §§ 120, 365 to the previously filed Japanese Patent Application No. JP2017-182217 with a priority date of Sep. 22, 2017, which is incorporated by reference herein.

TECHNICAL FIELD

The present invention relates to docking devices in general, and in particular to a docking device that enables a portable information apparatus to be attached thereto and detached therefrom.

BACKGROUND

Portable information apparatuses designed to be lightweight and compact for the sake of portability frequently have limited features. For example, some notebook type personal computers (laptop PCs) limit their features in order to achieve reductions in weight and thickness. For such a laptop PC, a docking device can be utilized as a device for expanding features. The docking device can be connected through a connector to a laptop PC to expand the features of the laptop PC.

A docking device may include engaging members with hook portions that can engage with and disengage from an engaging hole of a portable information apparatus. The docking device has a locking member, which restricts the retracting movement of the engaging member in the direction of disengagement, thereby preventing an accidental release of an engagement state of the engaging members.

The locking member can slide in a device chassis of the docking device and comes in contact with the lower portions of the engaging members spaced away from the hook portions. Therefore, if a portable information apparatus having the engaging members engaged with the engaging hole is lifted with a considerable force from an apparatus mounting section while the engaging members are in engagement with the engaging hole, then the engaging members may pivot in the direction of disengagement, the portion in contact with the locking member being the pivot point, causing a rattle. In particular, as described above, there has been a marked trend of making the chassis of portable information apparatuses thinner and smaller in recent years, thus making it difficult to secure a space in the chassis for deeply inserting the hook portions of the engaging members into the engaging hole to establish engagement therebetween. For this reason, there has been a concern that, if the engaging members are forcibly pivoted in the direction of disengagement, the engagement of the hook portions with the engaging hole will be forcibly released in a thin portable information apparatus.

Consequently, it would be desirable to provide an improved docking device capable of firmly coupling to a portable information apparatus.

SUMMARY

In accordance with an embodiment of the present disclosure, a docking device includes a device chassis having an apparatus mounting section on which a portable information apparatus is placed; an engaging member that projects from a surface of the device chassis, which has a hook portion that can engage with and disengage from the engaging hole of the portable information apparatus, and which is movable between an engagement position at which the hook portion engages with the engaging hole and a disengagement position at which the engagement of the hook portion with the engaging hole is released; and a restricting member that is movable between a retraction position at which the engaging member is allowed to move from the engagement position to the disengagement position and a restriction position at which the movement of the engaging member from the engagement position to the disengagement position is restricted by coming in contact with the engaging member at a rear surface of the hook portion, wherein the rear surface of the hook portion of the engaging member has an inclined surface that gradually inclines towards the hook portion in a direction in which the engaging member projects, and the restricting member has a contact surface which inclines such that the contact surface gradually becomes wider in the direction in which the engaging member projects and which comes in contact with the inclined surface of the engaging member at the restriction position.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
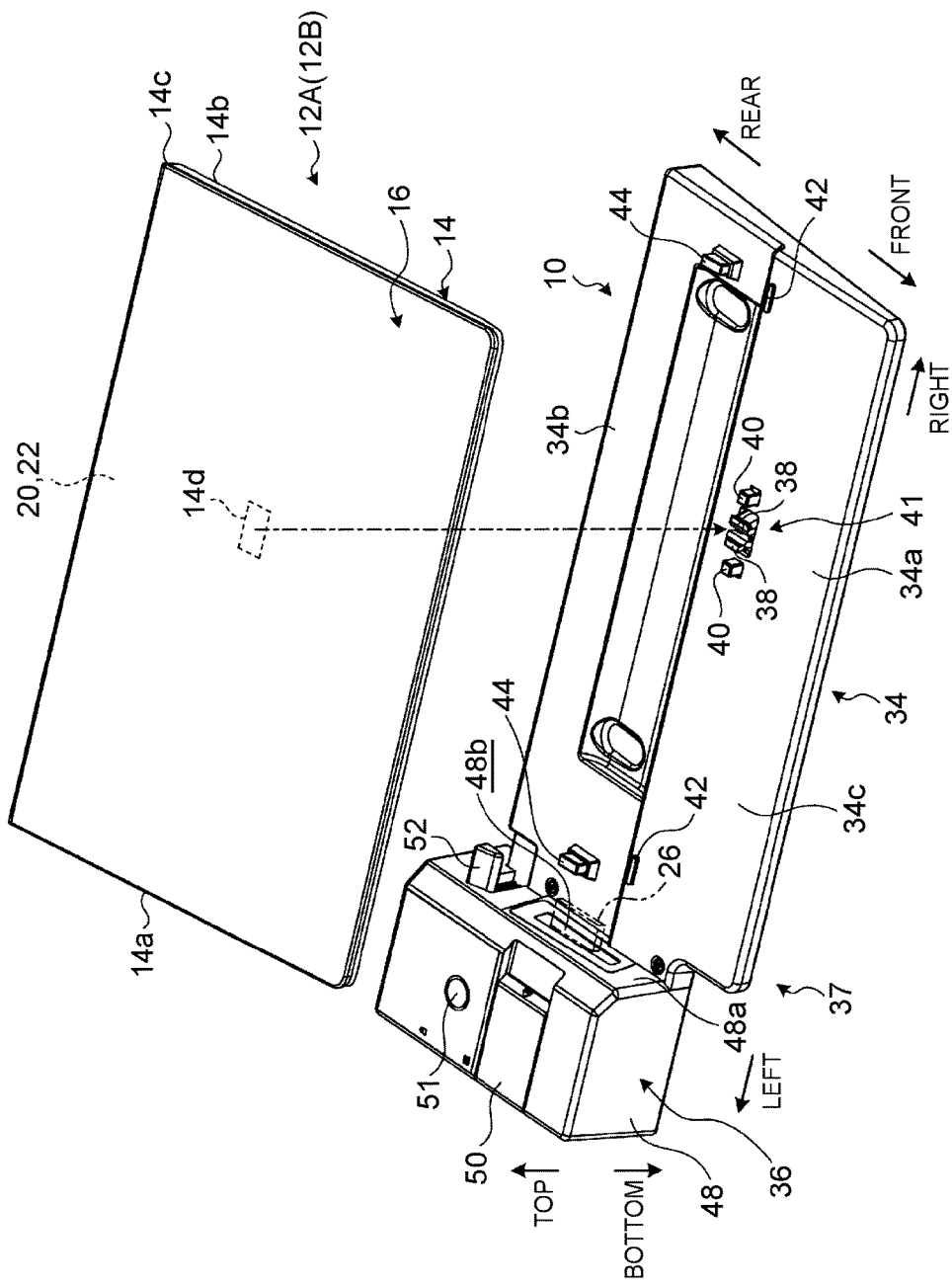
FIG. 1 is an exploded perspective view illustrating the operation for docking a portable information apparatus to a docking device, according to a first embodiment.
Figure 2A:
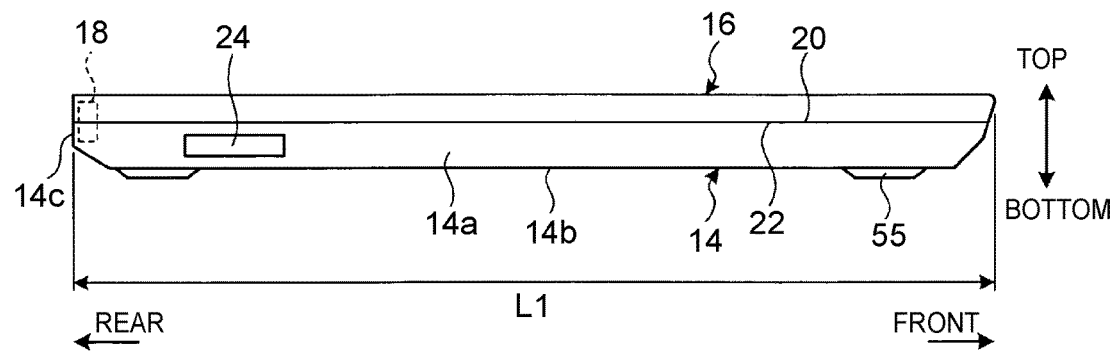
FIG. 2A is a side view of the portable information apparatus from FIG. 1.
Figure 2B:
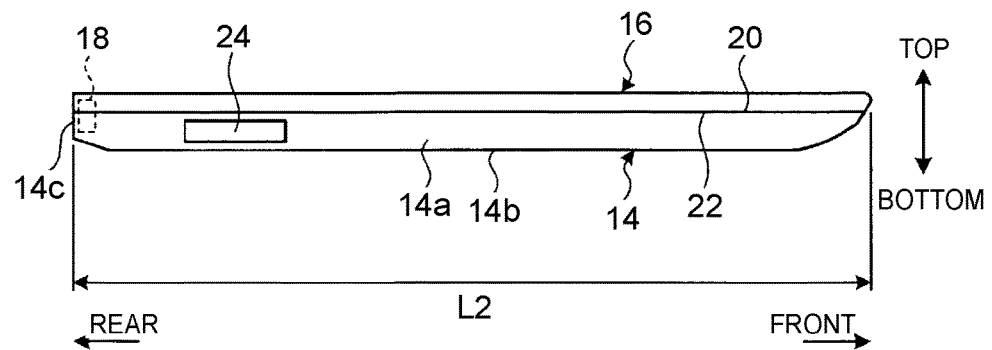
FIG. 2B is a side view of a portable information apparatus having different specifications from those of the portable information apparatus illustrated in FIG. 2A.

FIG. 1 is an exploded perspective view illustrating the operation for docking a portable information apparatus 12A to a docking device 10 according to a first embodiment of the present invention. FIG. 2A is a side view of the portable information apparatus 12A. FIG. 2B is a side view of a portable information apparatus 12B having different specifications from those of the portable information apparatus 12A illustrated in FIG. 2A.

The docking device 10 according to the present embodiment enables the portable information apparatus 12A (12B), which is, for example, a laptop PC, to be attached thereto and detached therefrom. The portable information apparatus 12A and the portable information apparatus 12B have at least different external shapes. The docking device 10 enables the attaching of a plurality of types of portable information apparatuses in addition to the portable information apparatuses 12A and 12B; however, the following will representatively describe the cases where the two types of the portable information apparatuses 12A and 12B are attached and detached. The docking device 10 may be configured to enable the attaching and detaching of only the portable information apparatus 12A or the portable information apparatus 12B. The docking device 10 is adapted to expand functions, typically represented by the connection of the portable information apparatus 12A or 12B which has been attached thereto to a plurality of peripheral equipment or a network. Therefore, an electronic apparatus having the portable information apparatus 12A or 12B attached to the docking device 10 provides higher functionality than the portable information apparatus 12A or 12B alone. The docking device 10 can be used for the expansion of a portable information apparatus other than a laptop PC, and may be used for the functional expansion of, for example, a tablet PC, a cellular phone, a smart phone or an electronic organizer.

In the following description, the state in which the portable information apparatus 12A (12B) has been mounted on the docking device 10 will be the reference state, the front side in FIG. 1 will be referred to as the front and the back side as the rear, the direction of thickness of the docking device 10 or the portable information apparatus 12A (12B) will be referred to as the vertical direction, and the direction of width thereof will be referred to as the lateral direction.

As illustrated in FIG. 2A, the portable information apparatus 12A as an example of an object to be connected to the docking device 10 is configured such that a display chassis 16 is coupled to an apparatus chassis 14 in an openable and closable manner by a hinge 18. In the portable information apparatus 12A, a keyboard 20 is provided on the upper surface of the apparatus chassis 14, and a display 22 is provided on the lower surface of the display chassis 16. A connection terminal 24 is provided on the left surface (a side surface 14a) of the apparatus chassis 14.

The connection terminal 24 is disposed on the side surface 14a at a position close to the rear end. The connection terminal 24 may have a configuration in which, for example, a plurality of connection terminals is arranged in parallel in the longitudinal direction. A connector 26 of the docking device 10 can be connected to the connection terminal 24. The docking device 10 is electrically connected with the portable information apparatus 12A by connecting the connector 26 to the connection terminal 24. This enables the portable information apparatus 12A to use various expanded functions installed in the docking device 10. The connector 26 and the connection terminal 24 conform to a connection standard, for example, the Universal Serial Bus (USB) standard.

As described above, the docking device 10 according to the present embodiment enables the attaching and detaching of the portable information apparatus 12B, which has different specifications, i.e. different dimensions in the longitudinal direction, from those of the portable information apparatus 12A illustrated in FIG. 2A.

As illustrated in FIG. 2B, the portable information apparatus 12B as another example of the object to be connected to the docking device 10 has the same structure as that of the portable information apparatus 12A illustrated in FIG. 2A except for the dimensions in the longitudinal direction and the thickness dimension. For the portable information apparatus 12B illustrated in FIG. 2B, the same or like elements as those of the portable information apparatus 12A illustrated in FIG. 2A will be assigned the same reference numerals and detailed description will be omitted. Referring to FIG. 2B, the portable information apparatus 12B has a longitudinal dimension L2, which is shorter than a longitudinal dimension L1 of the portable information apparatus 12A. In the portable information apparatus 12A and the portable information apparatus 12B, the interval from a rear end surface 14c to the connection terminal 24 is set to be the same or substantially the same.

Figure 3A:
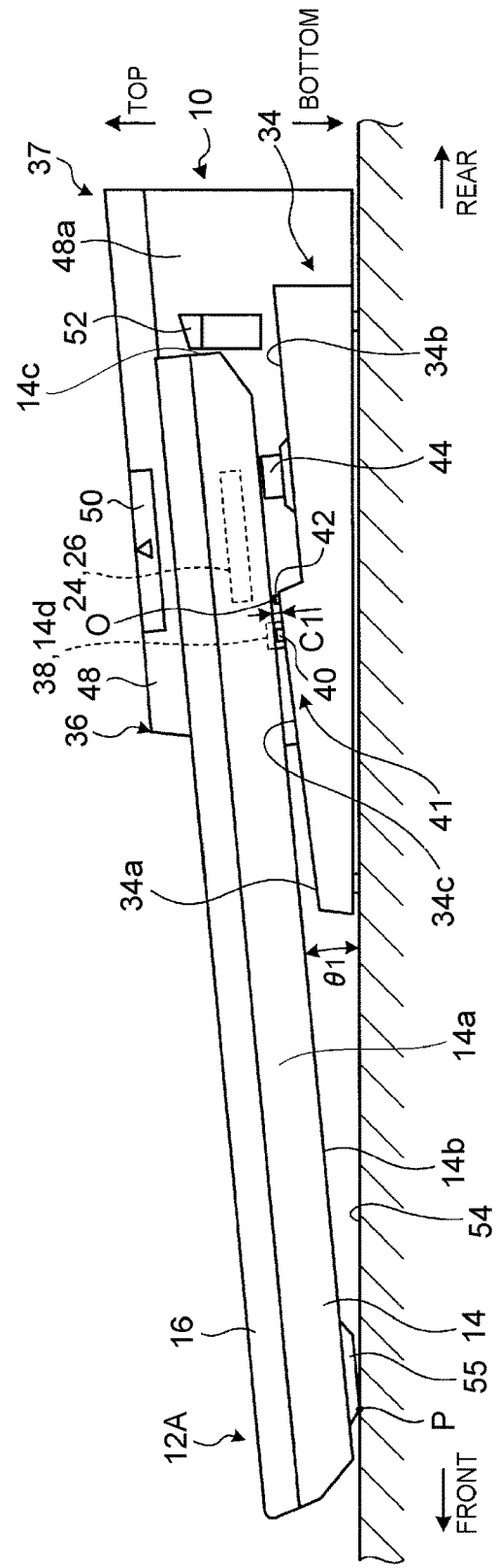
FIG. 3A is a side view of the portable information apparatus from FIG. 2A and which has been attached to the docking device.
Figure 3B:
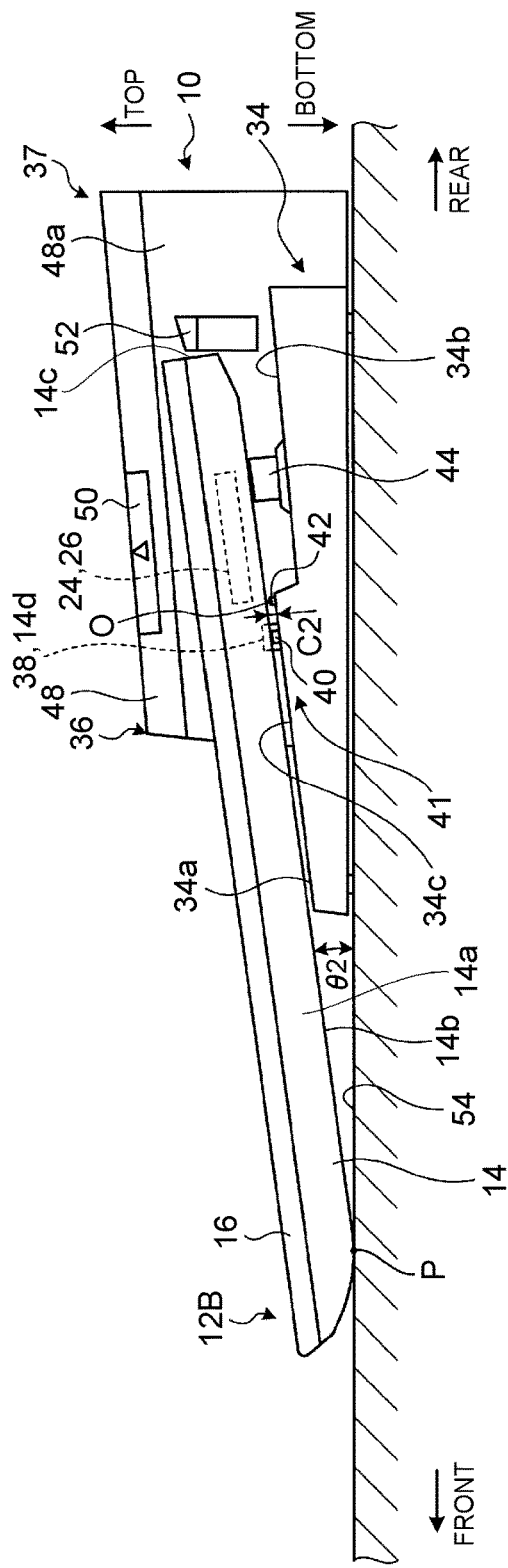
FIG. 3B is a side view of the portable information apparatus from FIG. 2B and which has been attached to the docking device.

FIG. 3A is a side view illustrating the state in which the portable information apparatus 12A, which is illustrated in FIG. 2A, has been attached to the docking device 10. FIG. 3B is a side view schematically illustrating the state in which the portable information apparatus 12B, which is illustrated in FIG. 2B, has been attached to the docking device 10.

As illustrated in FIG. 1, FIG. 3A and FIG. 3B, the docking device 10 is used with the apparatus chassis 14 of the portable information apparatus 12A or the portable information apparatus 12B mounted thereon. The docking device 10 includes a device chassis 37 comprised of an apparatus mounting section 34 and a connecting mechanism unit 36.

The apparatus mounting section 34 is, for example, a thin box which has an upper surface having a size that enables an approximately half part on the rear side of the portable information apparatus 12A or 12B to be mounted thereon and which is formed of a resin or the like. The apparatus mounting section 34 includes a mounting base 34a on which a bottom surface 14b of the portable information apparatus 12A or 12B is mounted. The mounting base 34a has an inclined surface that inclines such that the height dimension thereof gradually increases toward the rear from the front. Provided on the rear side of the mounting base 34a is a relief section 34b formed to be lower than the mounting base 34a by one step. The relief section 34b is a recess for clearing a battery or the like, which is not illustrated, in the case where the battery or the like projects from the rear bottom surface of the portable information apparatus 12A or 12B.

On the mounting base 34a, a pair of engaging members 38 and a pair of ascending/descending members 40 project from around the center of an upper surface 34c. The engaging member 38 and an ascending/descending member 40 on the left side and the engaging member 38 and an ascending/descending member 40 on the right side are disposed, opposing each other and being laterally symmetrical to each other. Each of the engaging members 38 can engage with and disengage from an engaging hole 14d provided in the bottom surface 14b of the portable information apparatus 12A or 12B. The engagement of the engaging members 38 with the engaging hole 14d locks the portable information apparatus 12A or 12B to the apparatus mounting section 34 thereby to prevent the portable information apparatus 12A or 12B from vertically slipping off. In other words, the engaging members 38 constitute a coupling mechanism 41 for detachably coupling the portable information apparatus 12A or 12B to the docking device 10. The ascending/descending members 40 move up or down by being pressed by the bottom surface 14b of the portable information apparatus 12A or 12B placed on the mounting base 34a. The ascending/descending members 40 act as detectors that detect the clearance (the distance in the vertical direction) between the bottom surface 14b of the portable information apparatus 12A or 12B and the upper surface 34c of the mounting base 34a at the positions where the engaging members 38 are provided.

The mounting base 34a is provided with leg members 42 on both left and right ends of the upper surface 34c to support the bottom surface 14b of the portable information apparatus 12A or 12B. The left and right leg members 42, 42 are arranged in the lateral direction and the positions thereof in the longitudinal direction on the upper surface 34c of the mounting base 34a coincide or substantially coincide. The leg members 42 are, for example, prismatic projections extending in the lateral direction and are formed of a resin, a hard rubber or the like.

The relief section 34b has rear support legs 44 provided on both left and right ends of the upper surface 34c. The rear support legs 44 support the rear end portion of the bottom surface 14b of the portable information apparatus 12A or 12B placed on the mounting base 34a. The rear support legs 44 are, for example, elevatably provided, and support the portable information apparatus 12A or 12B at a predetermined elevated position by an elastic member, a stopper mechanism or the like, which is not illustrated.

The connecting mechanism unit 36 has a box 48 which is formed of a resin or the like and shaped like a rectangular parallelepiped. The box 48 has a height dimension that is larger than that of the apparatus mounting section 34. The box 48 has a wall section 48a which rises at a side portion of the apparatus mounting section 34 and faces against the side surface 14a of the portable information apparatus 12A or 12B placed on the apparatus mounting section 34. The connector 26 is provided such that the connector 26 can advance or retract in the lateral direction toward the side surface 14a of the portable information apparatus 12A or 12B from an opening 48b formed in the wall section 48a.

An operating lever 50 and a power button 51 are provided on the upper surface of the box 48. The operating lever 50 is a control section for moving the connector 26 toward or away from the opening 48b. The power button 51 is a button for turning on/off the power of the docking device 10.

The connecting mechanism unit 36 has a positioning member 52 behind the opening 48b. The positioning member 52 projects to the right from the wall section 48a. The positioning member 52 comes in contact with the rear end surface 14c of the portable information apparatus 12A or 12B placed on the apparatus mounting section 34 thereby to position the portable information apparatus 12A or 12B in the longitudinal direction. The positioning member 52 is provided to be vertically movable so as not to interfere with the opening/closing movement of the display chassis 16, and is normally elastically urged upward.

As illustrated in FIG. 3A and FIG. 3B, the docking device 10 is usually used, being placed on a planar use surface 54, such as the upper surface of a desk. When the portable information apparatus 12A or 12B is attached to the docking device 10, the front end thereof comes in contact with and is supported by the use surface 54, while the rear end thereof comes in contact with and is supported by the leg members 42 on the mounting base 34a, thus being placed at an angle with the front thereof down. In the case of the present embodiment, the portable information apparatus 12A or 12B will have the position where the bottom surface 14b comes in contact with the left and right leg members 42 as a reference point O of the mounting position with respect to the docking device 10. With this reference point O established as the reference, a landing point P of the bottom surface 14b comes in contact with the use surface 54, causing the portable information apparatus 12A or 12B to be stabilized with the front end thereof inclined downward. In the portable information apparatus 12A illustrated in FIG. 3A, a front rubber leg 55 provided on the bottom surface 14b provides the landing point P.

Meanwhile, the portable information apparatus 12A and the portable information apparatus 12B differ in the longitudinal dimension thereof. Hence, the distance from the reference point O to the landing point P of the portable information apparatus 12A is larger (refer to FIG. 3A). On the other hand, the distance from the reference point O to the landing point P of the portable information apparatus 12B is smaller than that of the portable information apparatus 12A (refer to FIG. 3B). At this time, in the portable information apparatuses 12A and 12B, the rear end surfaces 14c in the longitudinal direction are positioned by the positioning members 52. As a result, in each of the portable information apparatuses 12A and 12B, the front end side vertically pivots or swings about the reference point O on the rear end side, causing the landing point P to land on the use surface 54.

In this case, the angle of the front-down attitude of the bottom surface 14b with respect to the use surface 54 when the portable information apparatus 12A is attached to the docking device 10 will be referred to as a mounting angle $\theta_1$ (refer to FIG. 3A), and the angle of the front-down attitude of the bottom surface 14b with respect to the use surface 54 when the portable information apparatus 12B is attached to the docking device 10 will be referred to as a mounting angle $\theta_2$ (refer to FIG. 3B). Then, the mounting angle $\theta_1$ of the portable information apparatus 12A is smaller than the mounting angle $\theta_2$ of the portable information apparatus 12B. As a result, a clearance C1 between the bottom surface 14b of the portable information apparatus 12A and the upper surface 34c of the mounting base 34a at the position where the engaging members 38 are provided on the front side of the reference point O is larger than a clearance C2 between the bottom surface 14b of the portable information apparatus 12B and the upper surface 34c of the mounting base 34a. Obviously, a portable information apparatus that has a larger longitudinal dimension than that of the portable information apparatus 12A will have a further smaller mounting angle and a further larger clearance between the bottom surface 14b and the upper surface 34c, whereas a portable information apparatus that has a smaller longitudinal dimension than that of the portable information apparatus 12B will have a further larger mounting angle and a further smaller clearance between the bottom surface 14b and the upper surface 34c.

Therefore, the docking device 10 according to the present embodiment includes a position adjusting mechanism 56 installed in the coupling mechanism 41. The position adjusting mechanism 56 advances or retracts the engaging members 38 according to the different clearances C1 and C2 based on the different longitudinal dimensions of the portable information apparatuses 12A and 12B thereby to move the engaging members 38 to the positions where the engaging members 38 securely engage with the engaging hole 14d. The position adjusting mechanism 56 can also accommodate the different clearances C1 and C2 based on, for example, the different heights of rubber legs provided on the bottom surface of a portable information apparatus rather than the foregoing different mounting angles. However, if, for example, no switching between the clearances C1 and C2 is involved, as in the case where the docking device 10 is exclusively used with portable information apparatuses of the same specifications, then the position adjusting mechanism 56 may be omitted.

A description will now be given of the configuration of the coupling mechanism 41 and the configuration of a sliding mechanism 58 which slides the connector 26 toward the portable information apparatus 12A (12B).

Figure 4A:
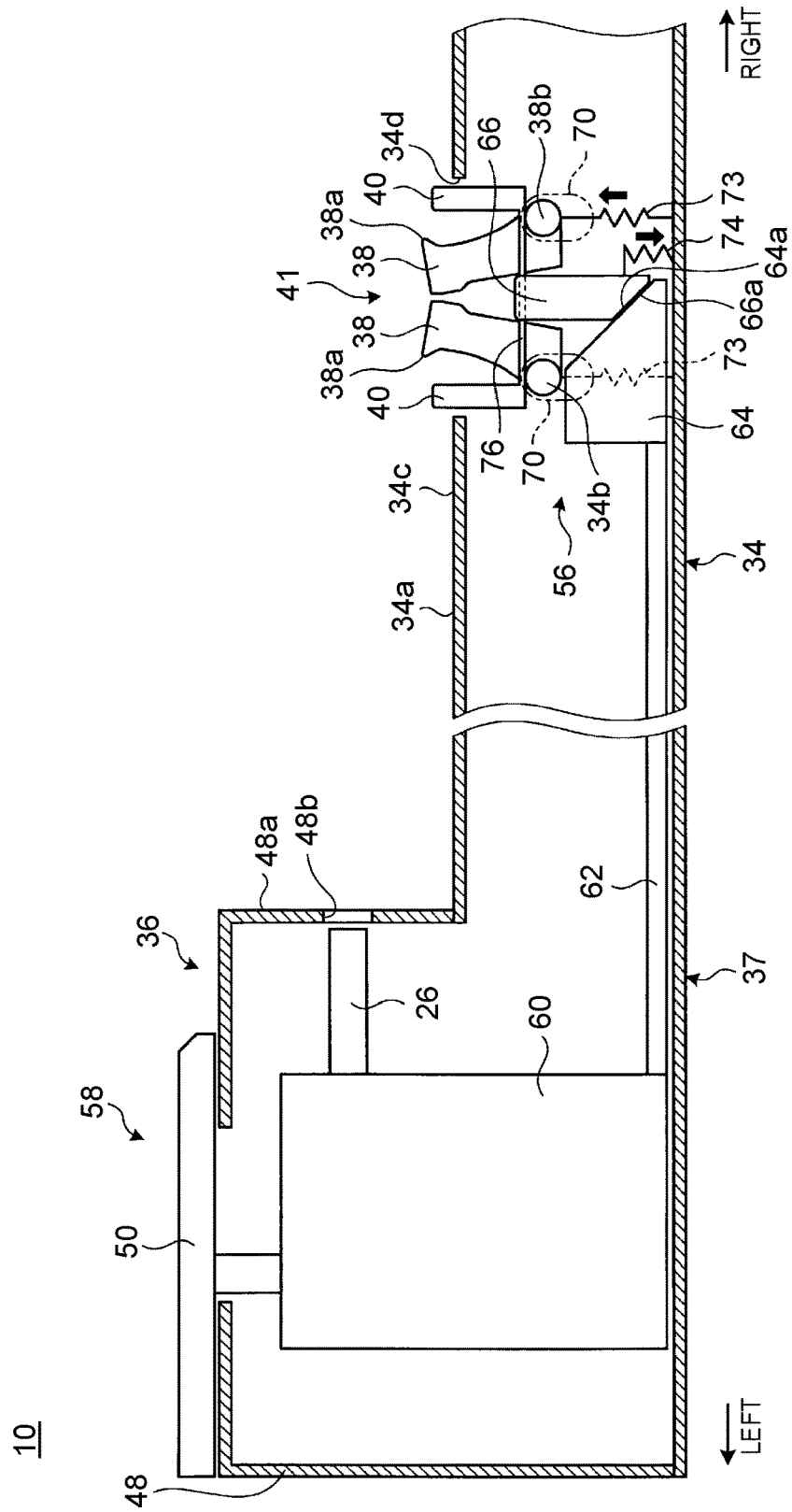
FIG. 4A is a side sectional view of the internal structure of the docking device in a state in which a connector has been retracted in an opening.
Figure 4B:
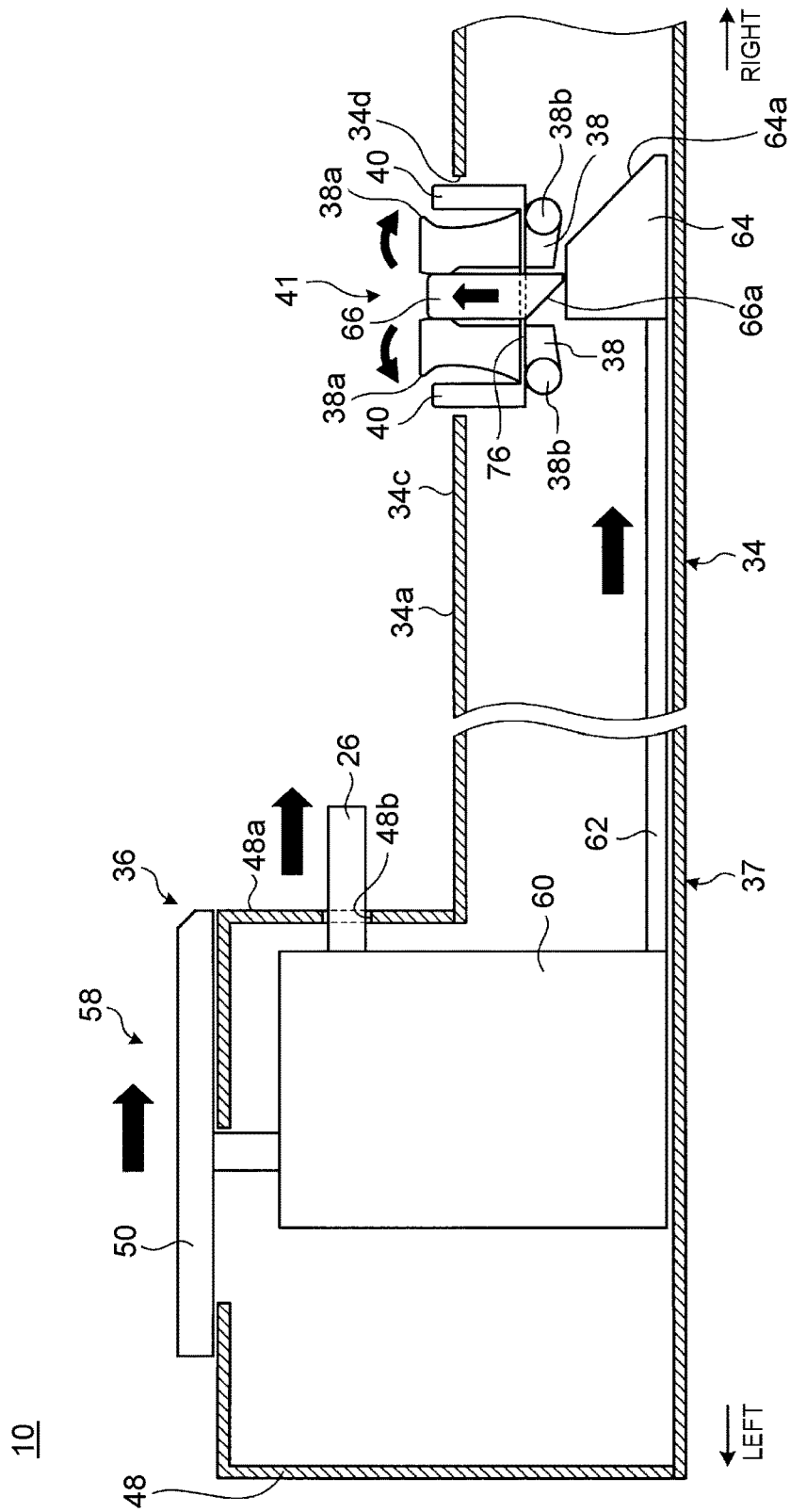
FIG. 4B is a side sectional view of the connector advanced to be out of the opening from the state illustrated in FIG. 4A by using a sliding mechanism.
Figure 5A:
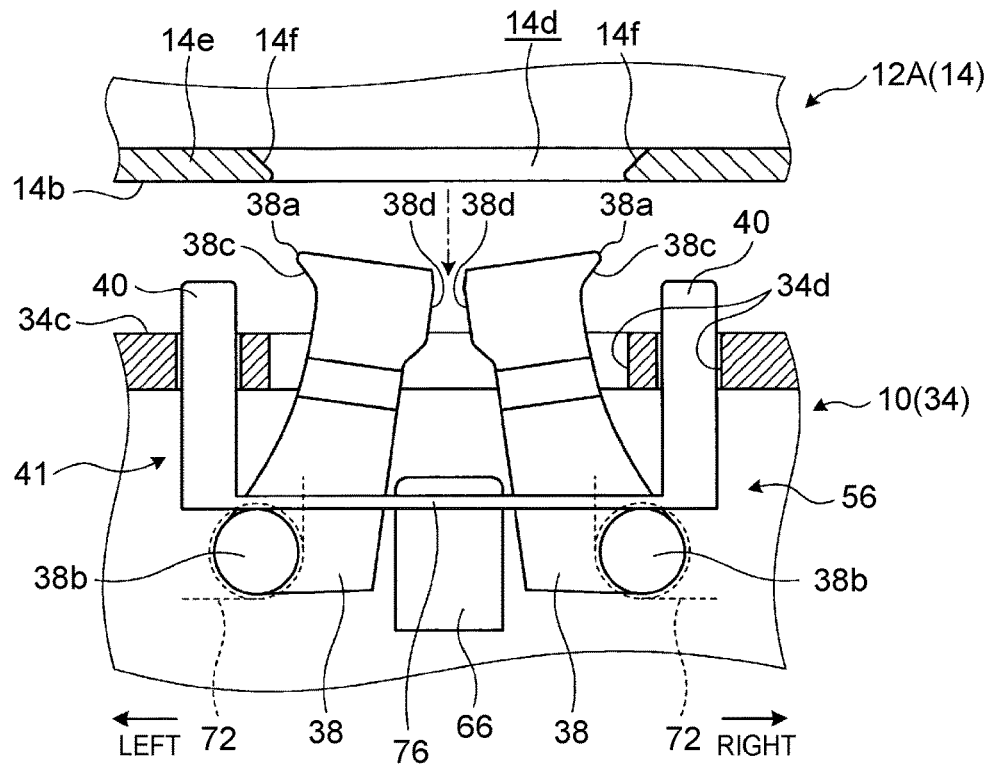
FIG. 5A is a side sectional view illustrating the state of a coupling mechanism when the portable information apparatus illustrated in FIG. 2A is attached to the docking device.
Figure 5B:
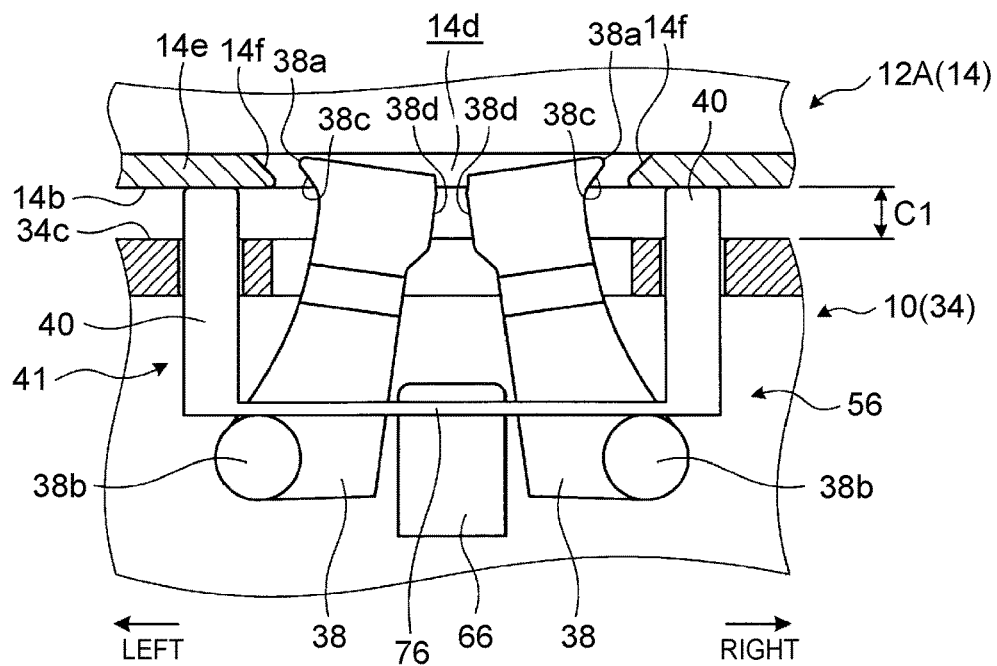
FIG. 5B is a side sectional view illustrating the state in which engaging members have entered in an engaging hole from the state illustrated in FIG. 5A.
Figure 5C:
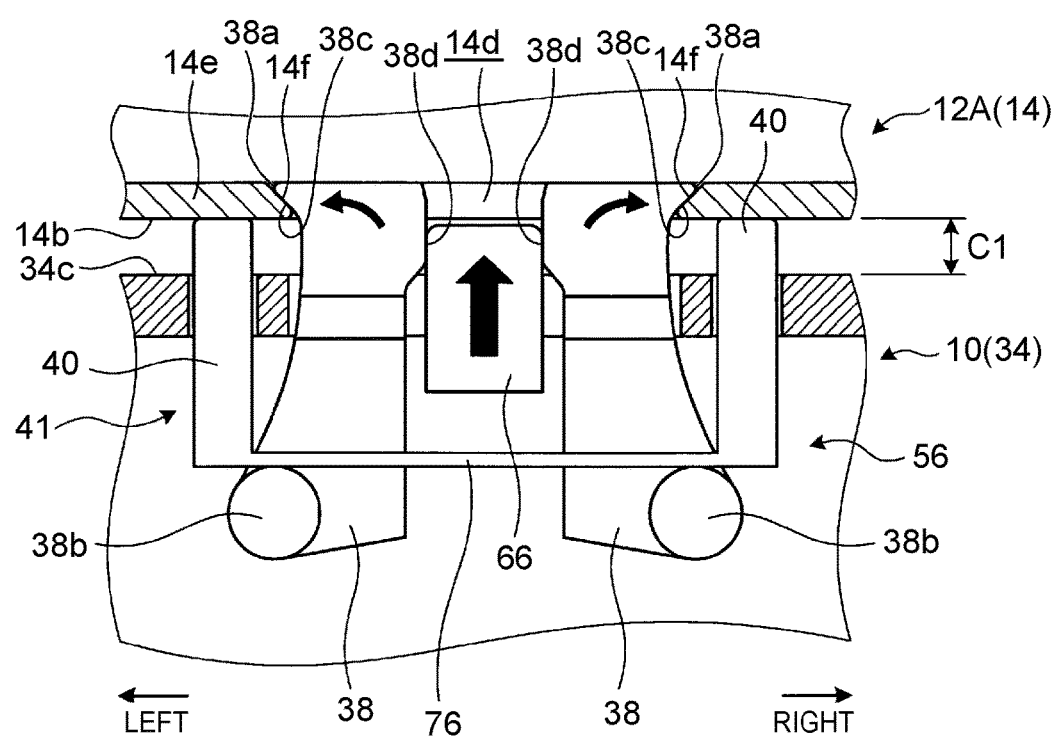
FIG. 5C is a side sectional view illustrating the state in which the engaging members have engaged with the engaging hole from the state illustrated in FIG. 5B.
Figure 6A:
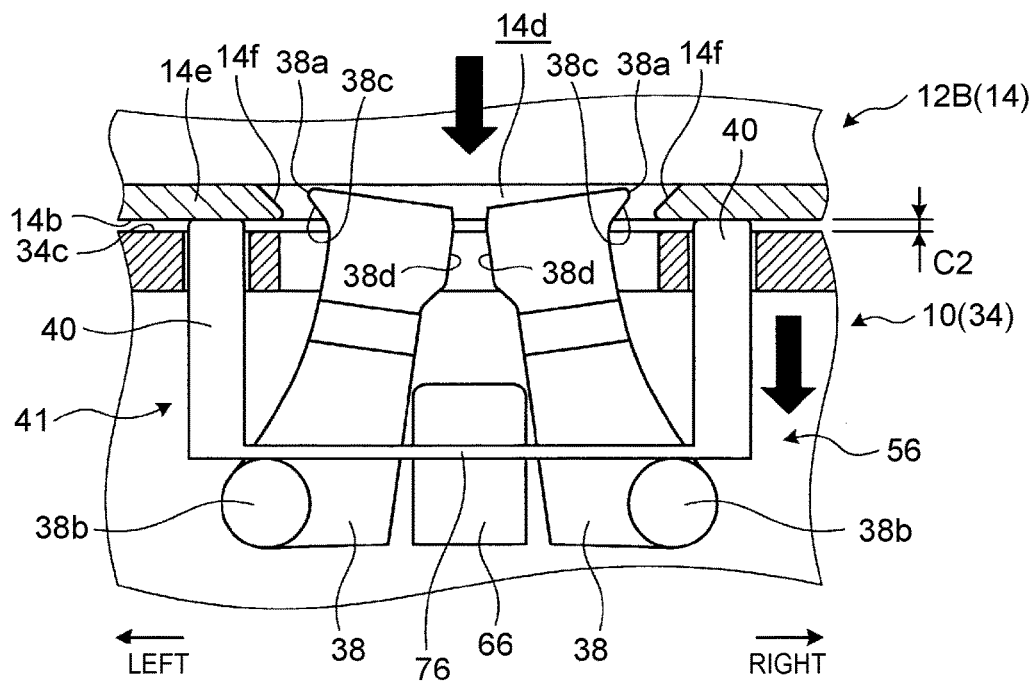
FIG. 6A is a side sectional view illustrating the state of the coupling mechanism when the portable information apparatus illustrated in FIG. 2B is attached to the docking device.
Figure 6B:
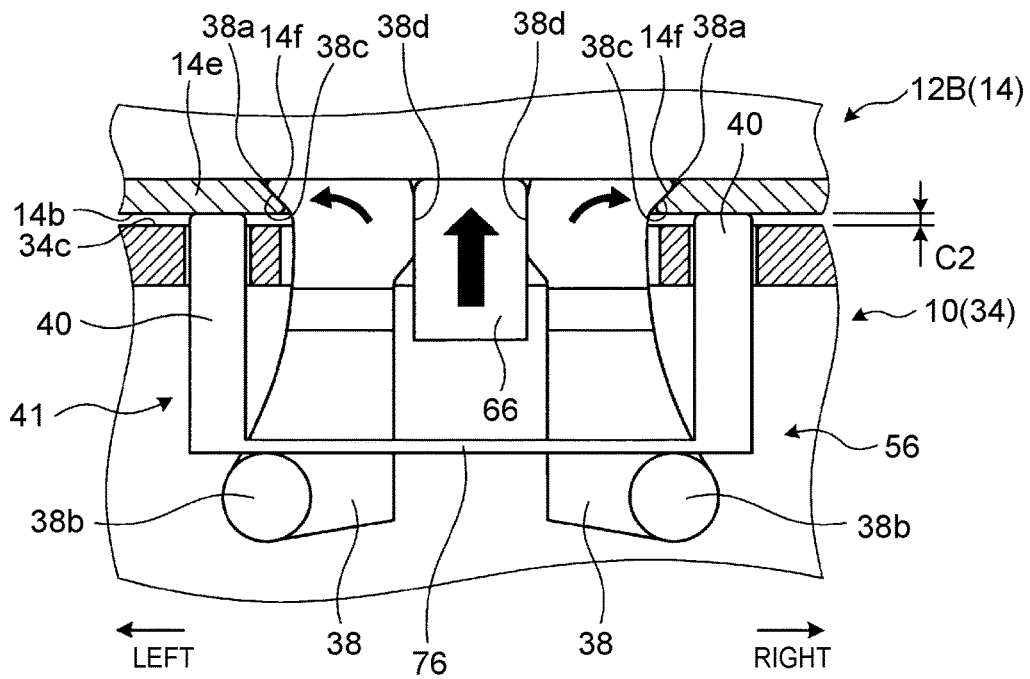
FIG. 6B is a side sectional view illustrating the state in which the engaging members have engaged with the engaging hole from the state illustrated in FIG. 6A.

FIG. 4A is a side sectional view schematically illustrating the internal structure of the docking device 10 in a state in which the connector 26 has been retracted in the opening 48b. FIG. 4B is a side sectional view schematically illustrating the state in which the connector 26 has been moved out of the opening 48b from the state illustrated in FIG. 4A by using the sliding mechanism 58. FIG. 5A to FIG. 5C are side sectional views schematically illustrating the operating states of the coupling mechanism 41 when the portable information apparatus 12A illustrated in FIG. 2A is attached to the docking device 10. FIG. 6A and FIG. 6B are side sectional views schematically illustrating the operating states of the coupling mechanism 41 when the portable information apparatus 12B illustrated in FIG. 2B is attached to the docking device 10.

As illustrated in FIG. 4A and FIG. 4B, the sliding mechanism 58 has the operating lever 50 and a slide base 60.

The operating lever 50 is provided, being slidable in the lateral direction on the upper surface of the box 48. The operating lever 50 is coupled to the slide base 60 through a bar-like member projecting from the lower surface thereof. The connector 26 is protrusively provided on the right surface of the slide base 60 through, for example, a floating mechanism or the like, which is not illustrated. A sliding member 62 is fixed to the lower part of the right surface of the slide base 60. The sliding member 62 is a lengthy plate-like member that extends rightward in the device chassis 37 to the coupling mechanism 41. The distal end of the sliding member 62 is provided with a push-up member 64. The upper surface of the push-up member 64 has a push-up surface 64a that gradually inclines downward toward the right side, which is the distal end side of the sliding member 62.

In the sliding mechanism 58, sliding the operating lever 50 in the lateral direction causes the slide base 60 to slide in the lateral direction. This causes the connector 26 to move forward or backward in the lateral direction to move out of or into the opening 48b. At this time, as the slide base 60 slides, the sliding member 62 and the push-up member 64 also slide in the lateral direction.

As illustrated in FIG. 4A and FIG. 5A, the coupling mechanism 41 has a pair of engaging members 38, 38, a restricting member 66, and the position adjusting mechanism 56.

Each of the engaging members 38 is a plate-like member which extends in the vertical direction and which has a hook portion-like shape. Each of the engaging members 38 has a hook portion 38a at the upper end portion (distal end portion) thereof, and has a rotating shaft 38b at the lower end portion (proximal end portion) thereof. The hook portion 38a is a triangular projection that engages with and disengages from the engaging hole 14d. A hook-side inclined surface 38c, which gradually inclines upward toward the distal end portion of the hook portion 38a is formed on the lower surface of the hook portion 38a. The rotating shaft 38b is supported rotatably and vertically movably by a bearing 70 supported inside the device chassis 37 (refer to FIG. 4A).

The left engaging member 38 has the hook portion 38a on the left end of the upper end portion and has the rotating shaft 38b on the left end of the lower end portion. The right engaging member 38 has the hook portion 38a on the right end of the upper end portion and has the rotating shaft 38b on the right end of the lower end portion. The left and right engaging members 38 are disposed to be laterally symmetrical to each other, and rear surfaces 38d of the hook portions 38a are disposed, opposing each other through the intermediary of the restricting member 66 and the space in which the restricting member 66 ascends and descends.

The hook portion 38a of each of the engaging members 38 projects upward from an opening 34d formed in the upper surface 34c of the mounting base 34a in a state in which the rotating shaft 38b is disposed inside the mounting base 34a. In this state, each of the engaging members 38 can pivot about the rotating shaft 38b between the engagement position where the hook portion 38a engages with the engaging hole 14d and the disengagement position where the engagement of the hook portion 38a with the engaging hole 14d is released. As illustrated in FIG. 5A to FIG. 5C, the moving direction of the left engaging member 38 from the disengagement position to the engagement position (the engagement direction) is the left direction (counterclockwise direction in the drawing), and the moving direction thereof from the engagement position to the disengagement position (the disengagement direction) is the right direction (the clockwise direction in the drawing). The engagement direction of the right engaging member 38 is the right direction (the clockwise direction in the drawing) and the disengagement position thereof is the left direction (the counterclockwise direction in the drawing). Each of the engaging members 38 is constantly urged in the disengagement direction toward the disengagement position from the engagement position by a torsion coil spring (elastic member) 72 provided around the rotating shaft 38b (refer to FIG. 5A). Further, each of the engaging members 38 is constantly urged by, for example, a coil spring 73 in a direction in which the engaging member 38 ascends together with the ascending/descending member 40 with respect to the device chassis 37 (refer to FIG. 4A).

The restricting member 66 can ascend and descend in the vertical direction between the rear surfaces 38d, 38d of the left and right engaging members 38 and is a plate-like member which is wide in the longitudinal direction. The restricting member 66 is supported such that the restricting member 66 ascends and descends with respect to the device chassis 37, and is constantly urged downward by, for example, a coil spring 74 (refer to FIG. 4A). The restricting member 66 has a pressure receiving surface 66a at the proximal end thereof. The pressure receiving surface 66a is an inclined surface disposed opposing the push-up surface 64a of the push-up member 64, and can be in sliding contact with and pressed by the push-up surface 64a (refer to FIG. 4A and FIG. 4B).

The restricting member 66 is supported such that the restricting member 66 can ascend and descend in the vertical direction with respect to the device chassis 37. The restricting member 66 can move between a retraction position where the upper end surface (the distal end surface) thereof is inside the mounting base 34a and a restriction position where the upper end surface thereof projects from the upper surface 34c of the mounting base 34a. At the retraction position illustrated in FIG. 4A and FIG. 5A, the restricting member 66 is apart from the rear surfaces 38d of the engaging members 38, thus allowing the engaging members 38 to move from the engagement position to the disengagement position. At the restriction position illustrated in FIG. 4B and FIG. 5C, the restricting member 66 comes in contact with the rear surfaces 38d of the engaging members 38 thereby to restrict the movement of the engaging members 38 from the engagement position to the disengagement position. Further, when the restricting member 66 moves up from the retraction position to the restriction position, the restricting member 66 presses the rear surfaces 38d of the left and right engaging members 38 by the left and right corners of the upper end surface thereof so as to move the engaging members 38 from the disengagement position to the engagement position against the urging force of the torsion coil spring 72 (refer to FIG. 5B and FIG. 5C).

The position adjusting mechanism 56 has the pair of the ascending/descending members 40, 40. The ascending/descending members 40 are bar-like members that extend in the vertical direction. The upper end portions of the ascending/descending members 40 project upward from the openings 34d, and the lower end portions are coupled with each other into one piece through an interlocking member 76. The interlocking member 76 can come in contact with the upper surfaces of the rotating shafts 38b of the engaging members 38 to push the engaging members 38 down. The interlocking member 76 is constantly urged by the coil spring 73 in the direction in which the interlocking member 76 moves up together with the engaging members 38 with respect to the device chassis 37. In other words, the device chassis 37 (the mounting base 34a) elevatably supports the engaging members 38 and the ascending/descending members 40 and also pivotably supports the engaging members 38. Further, the interlocking member 76 interlocks the ascending/descending movement of the ascending/descending members 40 with the advancing/retracting movement of the engaging members 38 in the vertical direction.

As illustrated in FIG. 5A and FIG. 6A, the engaging hole 14d of the portable information apparatuses 12A and 12B to be attached to and detached from the docking device 10 has a rectangular shape that enables, for example, the pair of the engaging members 38 to be inserted therein and removed therefrom. The engaging hole 14d is formed in a thick portion of an outer wall (bottom plate) 14e that constitutes the bottom surface 14b. The inner peripheral surface of the engaging hole 14d has hole-side inclined surfaces 14f on the left and right edge portions opposing at least the hook portions 38a of the engaging members 38. Each of the hole-side inclined surfaces 14f is an inclined surface that inclines in a direction in which the hole diameter of the engaging hole 14d gradually decreases from the inner surface side of the outer wall 14e toward the outer surface side thereof. As illustrated in FIG. 5C and FIG. 6B, each of the hole-side inclined surfaces 14f has a shape engageable with the hook-side inclined surface 38c provided on the hook portion 38a of each of the engaging members 38 (refer to FIG. 5C). The hole-side inclined surfaces 14f and the hook-side inclined surfaces 38c are inclined surfaces that are inclined by, for example, 45 degrees with respect to the docking direction (vertical direction) of the portable information apparatuses 12A and 12B relative to the docking device 10.

A description will now be given of the operation of attaching the portable information apparatus 12A (12B) to the docking device 10.

In a state before attaching the portable information apparatus 12A (12B) (an initial state), the docking device 10 is in an initial position at which the operating lever 50 has been retracted to the left side (refer to FIG. 4A). In this state, the connector 26 is in the box 48. Further, the restricting member 66 is in the retraction position at which the restricting member 66 is at its lowest level, and each of the engaging members 38 is at the disengagement position, having been pivoted by the urging force of the torsion coil spring 72. Further, the ascending/descending members 40 are at their initial positions, having ascended to their highest levels by the urging forces of the coil springs 73.

The portable information apparatus 12A (12B) are attached to the docking device 10 set in the initial state described above. First, to attach the portable information apparatus 12A illustrated in FIG. 2A, the portable information apparatus 12A is placed on the mounting base 34a. More specifically, as illustrated in FIG. 3A and FIG. 3B, the portable information apparatus 12A is placed on the mounting base 34a by positioning the rear end surface 14c by the positioning member 52 and the side surface 14a by the wall section 48a of the box 48. Thus, the front end side of the portable information apparatus 12A comes in contact with the use surface 54 at the landing point P and the rear end side thereof comes in contact with the leg members 42 at the reference point O, placing the portable information apparatus 12A at a mounting angle ?1 with respect to the use surface 54.

Thus, as illustrated in FIG. 5B, the engaging members 38 enter in the engaging hole 14d, and the top surfaces of the ascending/descending members 40 come in contact with the bottom surface 14b of the portable information apparatus 12A, forming a clearance C1 between the upper surface 34c of the mounting base 34a and the engaging hole 14d. When the ascending/descending members 40 are depressed by the bottom surface 14b, the engaging members 38 also descend together with the ascending/descending members 40 against the urging forces of the coil springs 73. In the present embodiment, however, the clearance C1 when the portable information apparatus 12A is mounted is set such that the bottom surface 14b comes in contact with but does not depress the top surfaces of the ascending/descending members 40 located in their initial positions. Hence, in FIG. 5A and FIG. 5B, the position adjusting mechanism 56 is not actuated, and the vertical positions of the ascending/descending members 40 and the engaging members 38 remain unchanged.

Subsequently, the operating lever 50 is slid to the right, as illustrated in FIG. 4B. This causes the connector 26 to be connected to the connection terminal 24. At the same time, the sliding member 62 is also slid to the right, causing the push-up surface 64a of the push-up member 64 to push up the pressure receiving surface 66a of the restricting member 66. Thus, the restricting member 66 ascends from the retraction position to the restriction position and comes in sliding contact with the rear surfaces 38d of the engaging members 38, causing the engaging members 38 to pivot from the disengagement position toward the engagement position against the urging forces of the torsion coil springs 72. As a result, the engaging members 38 reach the engagement position where the engaging members 38 engage with the engaging hole 14d, the pivotal movement thereof in the disengagement direction being restricted by the restricting member 66, as illustrated in FIG. 5C. Hence, the portable information apparatus 12A is firmly coupled with the docking device 10, thus preventing the engagement between the engaging members 38 and the engaging hole 14d from being forcibly released.

A description will now be given of how the portable information apparatus 12B illustrated in FIG. 2B is attached. The portable information apparatus 12B is placed on the mounting base 34a in the same manner as that in the case of the portable information apparatus 12A described above. This causes the front end side of the portable information apparatus 12B to come in contact with the use surface 54 at the landing point P and the rear end side thereof to come in contact with the leg members 42 at the reference point O, thus placing the portable information apparatus 12B at a mounting angle ?2 with respect to the use surface 54.

Thus, as illustrated in FIG. 6A, the engaging members 38 enter in the engaging hole 14d, and the top surfaces of the ascending/descending members 40 come in contact with the bottom surface 14b of the portable information apparatus 12B, forming a clearance C2 between the upper surface 34c of the mounting base 34a and the engaging hole 14d. More specifically, in this case, the position adjusting mechanism 56 is actuated and the ascending/descending members 40 are depressed by the bottom surface 14b, causing the engaging members 38 to descend against the urging forces of the coil springs 73. As a result, as illustrated in FIG. 6A, the engaging members 38 and the engaging hole 14d are adjusted to have a proper positional relationship in which the hook portions 38a and the peripheral portions thereof enter in the engaging hole 14d and the hook-side inclined surfaces 38c can engage with the hole-side inclined surfaces 14f, as with the case of the portable information apparatus 12A illustrated in FIG. 5B.

Subsequently, the operating lever 50 is slid to the right, as illustrated in FIG. 4B. This causes the connector 26 to be connected to the connection terminal 24. At the same time, the push-up surface 64a of the push-up member 64 pushes up the pressure receiving surface 66a of the restricting member 66. This causes the restricting member 66 to ascend from the retraction position to the restriction position and the engaging members 38 to pivot from the disengagement position toward the engagement position. As a result, the engaging members 38 reach the engagement position where the engaging members 38 are engaged with the engaging hole 14d, the pivotal movement thereof in the direction of disengagement being restricted by the restricting member 66, as illustrated in FIG. 6B. Hence, the portable information apparatus 12B is firmly coupled with the docking device 10, thus preventing the engagement between the engaging members 38 and the engaging hole 14d from being forcibly released.

Meanwhile, to detach the portable information apparatus 12A or the like from the docking device 10, the operating lever 50 is moved to the left to retract the connector 26, and the connector 26 is disconnected from the connection terminal 24. This releases the pushed-up state of the pressure receiving surface 66a of the restricting member 66 pushed up by the push-up surface 64a of the push-up member 64. Thus, the restricting member 66 returns to its initial position by the urging force of the coil spring 74, and the engaging members 38 are returned from the engagement position to the disengagement position by the urging forces of the torsion coil springs 72. As a result, the portable information apparatus 12A or the like can be smoothly detached from the apparatus mounting section 34.

As described above, the docking device 10 according to the present embodiment includes the engaging members 38, which project from the upper surface 34c, which is the surface of the device chassis 37, have the hook portions 38a, which can engage with and disengage from the engaging hole 14d of the portable information apparatuses 12A (12B), and can be moved between the engagement position where the hook portions 38a engage with the engaging hole 14d and the disengagement position where the engagement of the hook portions 38a with the engaging hole 14d is released, and the restricting member 66 which can be moved between the retraction position, at which the restricting member 66 is located inside the device chassis 37 to allow the engaging members 38 to move from the engagement position to the disengagement position, and the restriction position, at which the restricting member 66 projects from the upper surface 34c to come in contact with the engaging members 38 at the rear surfaces 38d of the hook portions 38a thereby to restrict the movement of the engaging members 38 from the engagement position to the disengagement position.

Thus, the docking device 10 can restrict the movement of the engaging members 38 from the engagement position to the disengagement position by the restricting member 66 at the restriction position where the restricting member 66 projects from the upper surface 34c. At this time, the rear surfaces 38d of the hook portions 38a of the engaging members 38 are restricted by the restricting member 66. Thus, in the docking device 10, even if, for example, the portable information apparatus 12A or the like is lifted from the apparatus mounting section 34 with a considerable force, the movement of the engaging members 38 from the engagement position to the disengagement position will be securely restricted by the restricting member 66. As a result, the docking device 10 enables firm coupling with the portable information apparatus 12A or the like. In particular, the restricting member 66 restricts the movement of the engaging members 38 by the rear surfaces 38d of the hook portions 38a, which are the distal end portions of the engaging members 38. Hence, even if the amount of engagement of the portable information apparatus 12A or the like with the engaging hole 14d is reduced so as to reduce the amount of entry thereof into the engaging hole 14d, the engagement of the engaging members 38 will not be forcibly released. As a result, in the portable information apparatus 12A and 12B, the depth of the engaging hole 14d can be reduced to a minimum or an electronic component, such as a board, can be disposed directly above the engaging hole 14d, thus making it possible to reduce the thickness and the size of the apparatus chassis 14.

Figure 7:
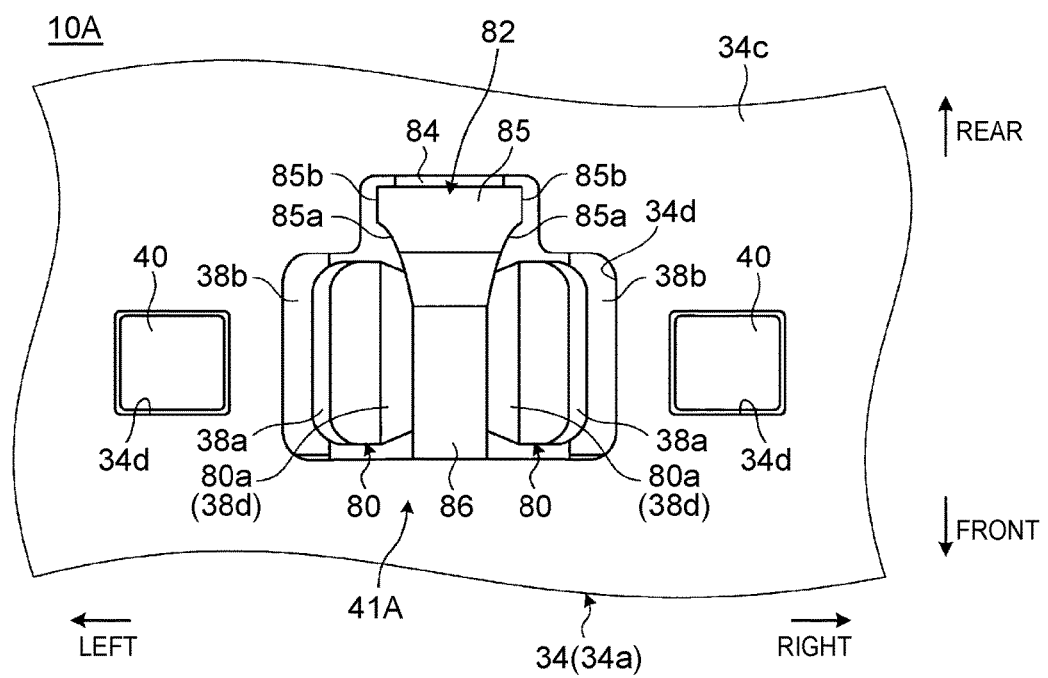
FIG. 7 is an enlarged plan view of an essential section of a docking device, according to a second embodiment.
Figure 8A:
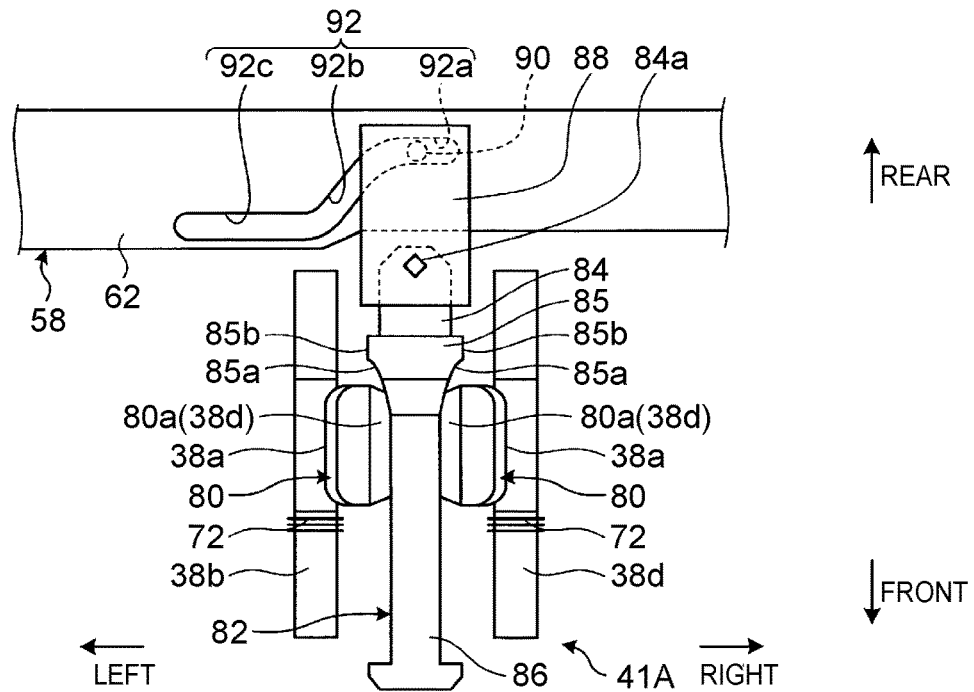
FIG. 8A is a side sectional view illustrating the internal structure of the docking device in a state in which the engaging members of a coupling mechanism illustrated in FIG. 7 are located at a disengagement position.
Figure 8B:
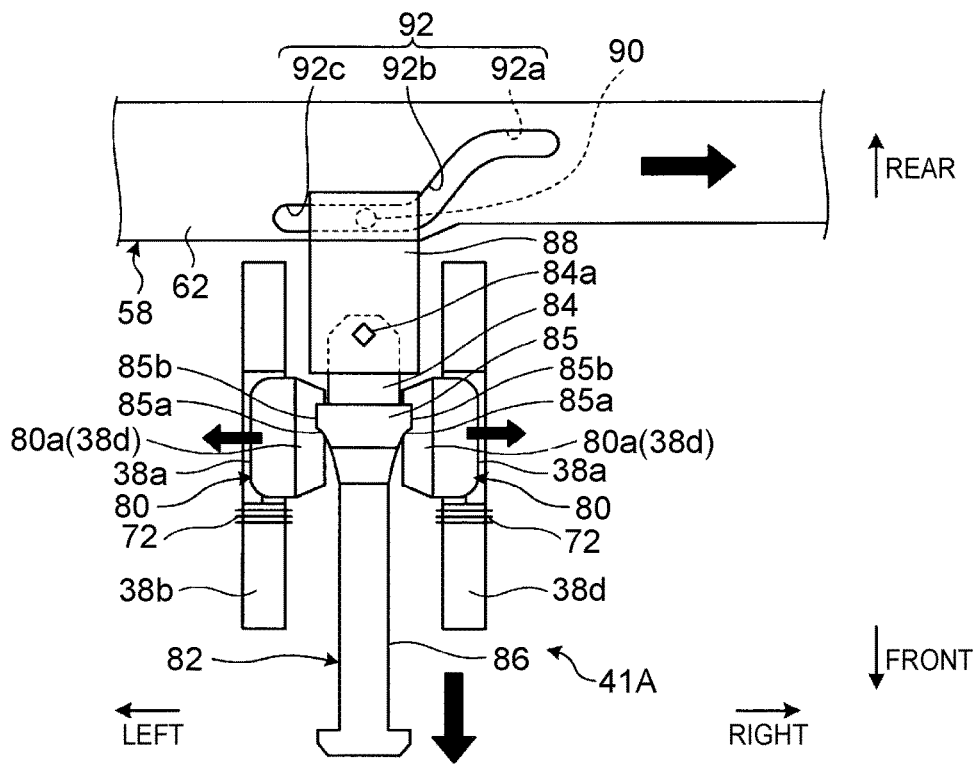
FIG. 8B is a side sectional view illustrating the internal structure of the docking device in a state in which the engaging members of the coupling mechanism have been moved to an engagement position from the state illustrated in FIG. 8A.
Figure 9A:
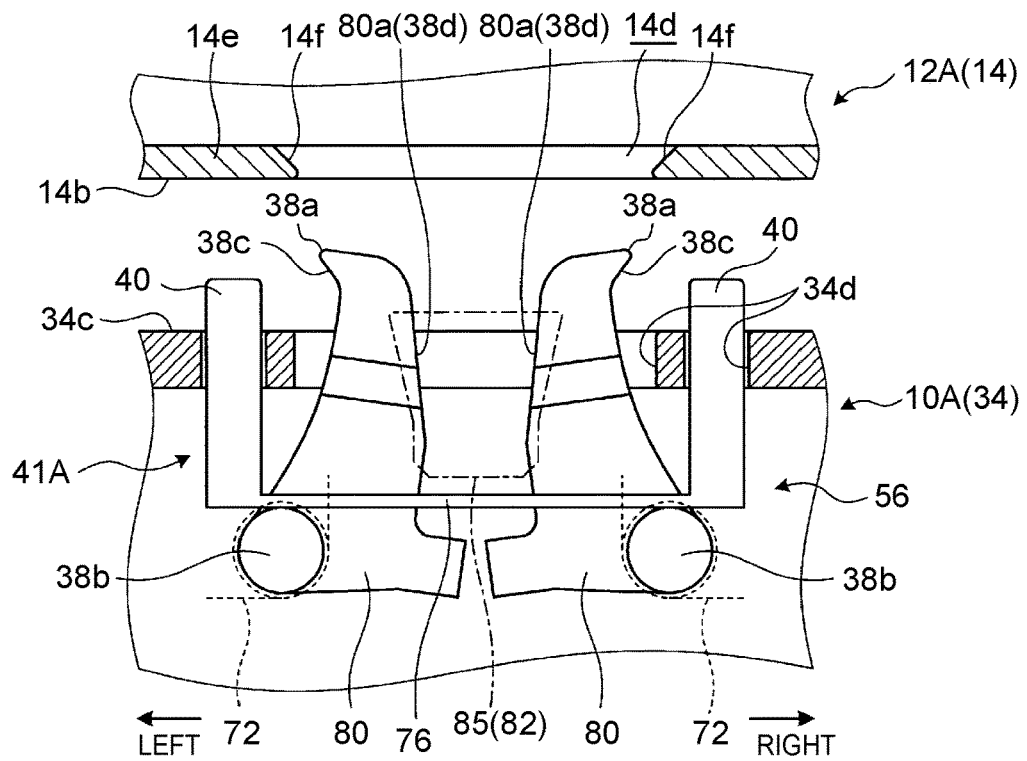
FIG. 9A is a side sectional view illustrating the state of the coupling mechanism when the portable information apparatus illustrated in FIG. 2A is attached to the docking device illustrated in FIG. 7.
Figure 9B:
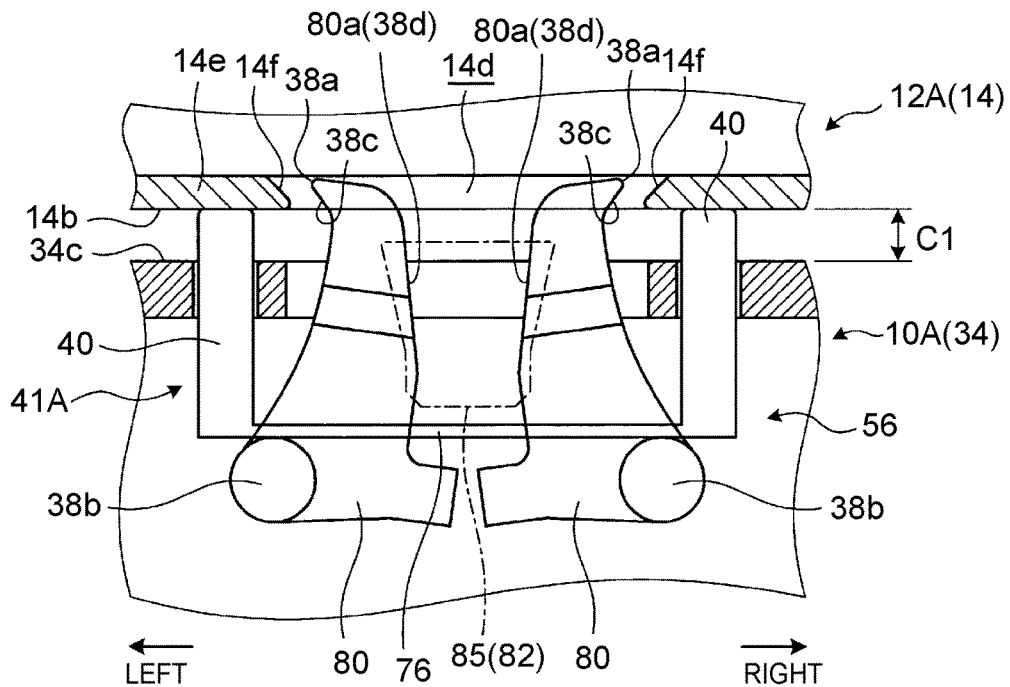
FIG. 9B is a side sectional view illustrating the state in which the engaging members have entered in the engaging hole from the state illustrated in FIG. 9A.
Figure 9C:
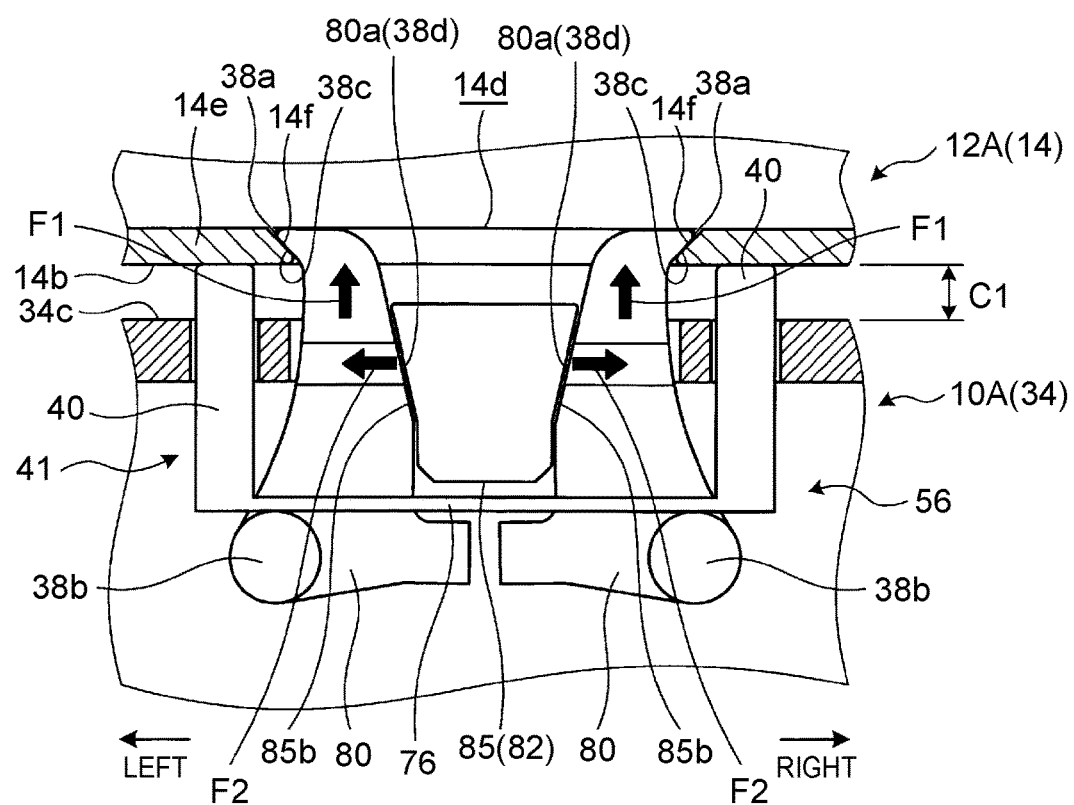
FIG. 9C is a side sectional view illustrating the state in which the engaging members have engaged with the engaging hole from the state illustrated in FIG. 9B.

FIG. 7 is an enlarged plan view of an essential section of a docking device 10A according to a second embodiment of the present invention, a coupling mechanism 41A and the surrounding part thereof provided on an apparatus mounting section 34 of the docking device 10A being illustrated in the enlarged view. FIG. 8A is a side sectional view schematically illustrating the internal structure of the docking device 10A in a state in which engaging members 80 of the coupling mechanism 41A are in a disengagement position. FIG. 8B is a side sectional view schematically illustrating the internal structure of the docking device 10A in a state in which the engaging members 80 of the coupling mechanism 41A have been moved to an engagement position from the state illustrated in FIG. 8A. FIG. 9A to FIG. 9C are side sectional views schematically illustrating the operating state of the coupling mechanism 41A when the portable information apparatus 12A illustrated in FIG. 2A is attached to the docking device 10A. In the docking device 10A according to the second embodiment, elements having the same or like functions and effects as those of the docking device 10 according to the foregoing first embodiment will be assigned the same reference numerals, and detailed descriptions thereof will be omitted.

Referring to FIG. 7 to FIG. 9C, the coupling mechanism 41A of the docking device 10A includes the engaging members 80 and a restricting member 82 which have different configurations from those of the engaging members 38 and the restricting member 66 of the foregoing coupling mechanism 41.

Each of the engaging members 80 has a hook portion 38a, a rotating shaft 38b, and a hook-side inclined surface 38c, and is a hook-shaped, plate-like member extending in the vertical direction, as with the foregoing engaging members 38. The engaging members 80 differ from the engaging members 38 described above in that rear surfaces 38d of the hook portions 38a have inclined surfaces 80a. In at least the engagement position illustrated in FIG. 9C, each of the inclined surfaces 80a gradually inclines toward the hook portions 38a in the direction in which the engaging members 80 project, i.e. in the detaching direction (upward) for detaching a portable information apparatus 12A (12B) from an apparatus mounting section 34 in the case of the present embodiment. In other words, the inclined surface 80a of the left engaging member 80 gradually inclines upward to the left. The inclined surface 80a of the right engaging member 80 gradually inclines upward to the right. The left and right engaging members 80 are disposed to be laterally symmetrical to each other, and the rear surfaces 38d (the inclined surfaces 80a) of the hook portions 38a are disposed, opposing each other through the intermediary of a space in which the restricting member 82 advances and retracts.

The restricting member 82 can advance and retract in the longitudinal direction between the rear surfaces 38d, 38d of the left and right engaging members 80. Referring to FIG. 8A and FIG. 8B, the restricting member 82 is a stepped bar-shaped member extending in the longitudinal direction, and has a coupling section 84, a restricting section 85, and a guiding section 86 in this order from the rear side toward the front side. The restricting member 82 can move between a retraction position at which the restricting section 85 retracts to the rear side of the engaging members 80, 80 (refer to FIG. 8A) and a restriction position at which the restricting section 85 enters between the engaging members 80, 80 (refer to FIG. 8B). As illustrated in FIG. 7 and FIG. 9A to FIG. 9C, the restricting member 82 of the present embodiment moves forward or backward at the position where at least the upper portion of the restricting section 85 projects upward from an opening 34d formed in the upper surface 34c of a mounting base 34a. More specifically, the restricting member 82 moves in the direction along the upper surface 34c of the mounting base 34a, which is the surface of a device chassis 37, the direction (longitudinal direction) being orthogonal to the direction in which the engaging members 80 project. In other words, the restricting member 82 moves in the in-plane direction of the upper surface 34c rather than the direction of thickness of the device chassis 37, so that the device chassis 37 can be made thinner.

The coupling section 84 is a plate piece projecting from the rear end surface of the restricting section 85, a coupling pin 84a being protrusively provided on the rear end of the coupling section 84. The coupling pin 84a is coupled to a link plate 88. The link plate 88 is a plate extending in the longitudinal direction and is disposed on the upper surface side of the coupling section 84 and a sliding member 62. The link plate 88 has the coupling pin 84a fitted in the front end portion thereof from the lower surface side and also has a guide pin 90 protrusively provided on the lower surface of the rear end portion thereof. The sliding member 62 of the docking device 10A has a guide hole 92 in place of the push-up member 64. The guide hole 92 is a hole in which the guide pin 90 is slidably inserted. The guide hole 92 has a retracting portion 92a, a drive portion 92b, and a restricting portion 92c in this order from the advancing direction (right side) to the retracting direction (left side) of the sliding member 62. The retracting portion 92a extends in the lateral direction at the right rear end part of the guide hole 92, the restricting portion 92c extends in the lateral direction at the left front end part of the guide hole 92, and the drive portion 92b gradually inclines to the front side from the right side to the left side, connecting the retracting portion 92a and the restricting portion 92c.

In the docking device 10A, the movement of the guide pin 90 is interlocked with the operation of the operating lever 50 when connecting a connector 26 to a connection terminal 24, and as the sliding member 62 is slid from the left side to the right side, the guide pin 90 moves from the retracting portion 92a to the restricting portion 92c via the drive portion 92b in the guide hole 92. At this time, the guide pin 90 moves from the rear side to the front side while moving the drive portion 92b and moves the restricting member 82 to the front side through the link plate 88. The guiding section 86 is a bar-shaped portion extending to the front from the front end surface of the restricting section 85. The guiding section 86 advances or retracts the restricting member 82 in the longitudinal direction while being guided by a guiding component which is fixed to the device chassis 37 and which is not illustrated.

The restricting section 85 is a substantially trapezoidal block in a plan view. The restricting section 85 has a pair of left and right sliding surfaces 85a, 85a and a pair of left and right contact surfaces 85b, 85b provided at the rear side of the sliding surfaces 85a. Each of the sliding surfaces 85a is an inclined surface that gradually inclines outward from the front side toward the rear side in a plan view. In other words, the sliding surface 85a on the left side gradually inclines to the left toward the rear side. The sliding surface 85a on the right side gradually inclines to the right toward the rear side. Thus, the front end portion of the restricting section 85 has a tapering shape formed by the left and right sliding surfaces 85a. Each of the contact surfaces 85b is an inclined surface which inclines to gradually become wider from the lower side toward the upper side (refer to FIG. 9C). More specifically, each of the contact surfaces 85b gradually inclines toward the engaging member 80 from the lower side toward the upper side. In other words, the left contact surface 85b gradually inclines to the left toward the upper side. The right contact surface 85b gradually inclines to the right toward the upper side. The contact surfaces 85b take inclined attitudes in parallel to the inclined surfaces 80a of the engaging members 80 and come in contact with the inclined surfaces 80a at the restriction position. As illustrated in FIG. 8A, the contact surfaces 85b are surfaces extending in the longitudinal direction, continuing from the rear ends of the sliding surfaces 85a.

In the restricting member 82, at the retraction position illustrated in FIG. 8A, FIG. 9A and FIG. 9B, the contact surfaces 85b of the restricting section 85 are apart from the inclined surfaces 80a of the engaging members 80, thus allowing the engaging members 80 to move from the engagement position to the disengagement position. In this state, the front ends of the sliding surfaces 85a of the restricting section 85 are in slidable contact with the rear ends of the rear surfaces 38d of the engaging members 80. In this state, when the restricting member 82 advances, the sliding surfaces 85a slide against and press the rear surfaces 38d (the inclined surfaces 80a) of the engaging members 80. This causes the engaging members 80 to gradually move from the disengagement position to the engagement position against the urging forces of torsion coil springs 72 (refer to FIG. 9B and FIG. 9C). Then, at the restriction position illustrated in FIG. 8B and FIG. 9C, the contact surfaces 85b of the restricting member 82 come in contact with the inclined surfaces 80a, thus restricting the movement of the engaging members 80 from the engagement position to the disengagement position.

A description will now be given of the operation for attaching the portable information apparatus 12A to the docking device 10A.

In the docking device 10A, when the operating lever 50 is in the initial position where the operating lever 50 has retracted to the left, the restricting member 82 is in the retraction position at which the restricting member 82 has retracted to a maximum, and the engaging members 80 are in the disengagement position, having been pivoted by the urging forces of the torsion coil springs 72. The position adjusting mechanism 56 is configured to be actuated to adjust the vertical position of the engaging members 80 when the appropriate portable information apparatus is placed on the mounting base 34a so as to attach the portable information apparatus 12A to the docking device 10A in the foregoing state. However, as with the case of the docking device 10, the vertical positions of the engaging members 80 are unchanged when attaching the portable information apparatus 12A.

Subsequently, as with the configuration example illustrated in FIG. 4B, the operating lever 50 is slid to the right to connect the connector 26 to the connection terminal 24. This causes the sliding member 62 to move to the right, advancing the restricting member 82 from the retraction position to the restriction position through the link plate 88. Thus, the engaging members 80 move from the disengagement position to the engagement position against the urging forces of the torsion coil springs 72 (refer to FIG. 9C), and the engaging members 80 engage with the engaging hole 14d. As a result, the pivoting motions of the engaging members 80 in the disengagement direction are restricted by the restricting member 82. The operation for attaching the portable information apparatus 12B is performed in the same manner as that for the portable information apparatus 12A except that the position adjusting mechanism 56 is actuated to adjust the vertical positions of the engaging members 80.

Meanwhile, in the docking device 10A, when the engaging members 80 reach the engagement position, the contact surfaces 85b of the restricting member 82 come in contact with the inclined surfaces 80a of the engaging members 80 (refer to FIG. 9C). Therefore, if the portable information apparatus 12A (12B) that has been attached is forcibly lifted from the docking device 10A in the direction (upward) in which the engaging members 80 project, then the engaging members 80 engaged with the engaging hole 14d are also subjected to upward lifting forces F1 (refer to FIG. 9C). This causes the component forces of the lifting forces F1 to be imparted to the contact surfaces 85b of the restricting member 82 from the inclined surfaces 80a of the engaging members 80. As a result, component forces F2, which are repulsive forces against the component forces of the lifting forces F1, act on the inclined surfaces 80a from the contact surfaces 85b, and the engaging members 80 are pressed in the direction of engagement by the component forces F2. In other words, in the docking device 10A, if the lifting forces F1 are imparted to the portable information apparatus 12A (12B) that has been attached, then the engaging members 80 will be pressed further in the direction of engagement with the engaging hole 14d, thus making the engagement even firmer.

As described above, in the docking device 10A according to the present embodiment, the rear surfaces 38d of the hook portions 38a of the engaging members 80 are provided with the inclined surfaces 80a, which gradually incline toward the hook portions 38a in the direction in which the engaging members 80 project at the engagement position, and the restricting member 82 is provided with the contact surfaces 85b, which incline to gradually become wider toward the direction in which the engaging members 80 project and which come in contact with the inclined surfaces 80a of the engaging members 80 at the restriction position.

Thus, the docking device 10A can restrict the movements of the engaging members 80 from the engagement position to the disengagement position by the restricting member 82. At this time, if the engaging members 80 are subjected to the forces (the lifting forces F1) that move the engaging members 80 in the direction of projection by the contact between the inclined surfaces 80a and the contact surfaces 85b, then the engaging members 80 are subjected to the forces (the component forces F2) in the direction of engagement from the restricting member 82. Hence, the portable information apparatus 12A (12B) is further firmly coupled to the docking device 10A, thus further securely preventing the engagement between the engaging members 80 and the engaging hole 14d from being forcibly released. Therefore, even if the amount of engagement of the engaging members 80 with the engaging hole 14d of the portable information apparatus 12A or the like is reduced so as to reduce the amount of entry thereof in the engaging hole 14d, the docking device 10A is capable of further securely preventing the engagement therebetween from being forcibly released. As a result, in the portable information apparatuses 12A and 12B, the depth of the engaging hole 14d can be reduced to a minimum or an electronic component, such as a board, can be disposed directly above the engaging hole 14d, thus making it possible to reduce the thickness and the size of the apparatus chassis 14.

Further, the restricting member 82 of the docking device 10A is located at the position where the restricting section 85 projects upward from the upper surface 34c of the mounting base 34a in at least the restriction position. This enables the restricting member 82 to restrict the movements of the engaging members 80 to the disengagement position at the position of the upper parts of the engaging members 80, thus further securely restricting the accidental movements of the engaging members 80 in the direction of disengagement. The entire restricting member 82 may be housed inside the device chassis 37; however, the restricting section 85 preferably comes in contact with the engaging members 80 at an upper position that is as close to the hook portions 38a as possible.

In the docking device 10 (10A), the engaging members 38 (80) have the distal end portions provided with the hook portions 38a and proximal portions on the opposite side from the distal end portions. The proximal end portions are rotatably supported in the device chassis 37, so that the hook portions 38a pivot between the engagement position and the disengagement position to engage with or disengage from the engaging hole 14d. Therefore, the amount of entry of the engaging members 38 in the engaging hole 14d can be reduced, as compared with the configuration in which the engaging members 38 are moved in the horizontal direction to engage with the engaging hole 14d, as with the prior art described above. As a result, the apparatus chassis 14 of the portable information apparatus 12A (12B) can be made further thinner and smaller. The engaging members 38 (80) may be configured to, for example, slide in the lateral direction to engage with the engaging hole 14d. In this case, the restricting member 66 (82) may be disposed in contact with the rear surfaces 38d of the engaging members 38 (80) engaged with the engaging hole 14d by, for example, the urging force of an elastic member, which is not illustrated.

In the docking device 10 (10A), the restricting member 66 (82) not only restricts the pivoting motions of the engaging members 38 (80) from the engagement position to the disengagement position but also functions as the drive members that drive the engaging members 38 (80) to pivot from the disengagement position to the engagement position. In other words, the restricting member 66 (82) can also drive the engaging members 38 (80) in the process of moving from the retraction position to restriction position. Thus, the single restricting member 66 (82) provides a plurality of functions, enabling reductions in the number of components and component cost.

In the docking device 10 (10A), the restricting member 66 (82) is disposed between the pair of engaging members 38, 38 (80, 80) at the restriction position to simultaneously restrict the movements of the engaging members 38 (80) from the engagement position to the disengagement position. Thus, the docking device 10 (10A) enables the single restricting member 66 (82) to restrict the pivoting motions of the pair of engaging members 38, 38 (80, 80), so that the number of components and component cost can be reduced. Further, as illustrated in FIG. 5C, FIG. 6B and FIG. 9C, for example, the right engaging members 38 (80) are arranged side by side, with the restricting member 66 (82) being located therebetween, in the direction of disengagement of the left engaging member 38 (80). Hence, if the portable information apparatus 12A (12B) is forcibly lifted upward, then the forces in the direction of disengagement from the left and right engaging members 38 (80) will be imparted to the restricting member 66 (82) from direct opposition, thus providing balance. This makes it possible to further securely prevent the engagement of the engaging members 38 (80) with the engaging hole 14d from being forcibly released. Only one or three or more of the engaging members 38 (80) may be provided. If only one engaging member 38 (80) is provided, then the restricting member 66 (82) is preferably held between one inner peripheral surface of the engaging hole 14d and the rear surface 38d of the engaging member 38 (80) at the restriction position.

In the docking device 10 (10A), the engaging members 38 (80) are provided at the position where the hook portions 38a project from the upper surface 34c of the apparatus mounting section 34, thereby enabling the engaging members 38 (80) to engage with or disengage from the engaging hole 14d formed in the bottom surface 14b of the portable information apparatus 12A (12B) and also to be moved from the upper surface 34c of the apparatus mounting section 34 toward or away from the bottom surface 14b of the portable information apparatus 12A (12B). Further, the docking device 10 (10A) has the ascending/descending members 40 serving as the detectors that detect the clearance C1 (C2) between the upper surface 34c of the apparatus mounting section 34 and the bottom surface 14b of the portable information apparatus 12A (12B) placed on the apparatus mounting section 34, and the position adjusting mechanism 56, which makes the positional adjustment of the hook portions 38a such that the hook portions 38a can engage with the engaging hole 14d by advancing or retracting the engaging members 38 (80) with respect to the engaging hole 14d on the basis of a result of detection of the clearance C1 (C2) by the ascending/descending member 40. With this arrangement, even if the clearance C1 (C2) between the engaging hole 14d and the upper surface 34c is switched when the portable information apparatus 12A (12B), which has different specifications, is attached to the docking device 10 (10A), the positions of the engaging members 38 (80) are adjusted according to the clearance C1 (C2). Thus, regardless of the difference in specifications between the portable information apparatuses 12A and 12B, the engaging members 38 and 80 smoothly and securely engage with the engaging hole 14d. Therefore, the docking devices 10 and 10A enable a plurality of types of portable information apparatuses 12A and 12B to be docked thereto, thus providing high versatility.

According to the electronic apparatus, in the portable information apparatus 12A (12B), the inner peripheral surface of the engaging hole 14d has the hole-side inclined surfaces 14f that gradually decrease the diameter of the engaging hole 14d from the inner surface side to the outer surface side of the outer wall 14e. In the docking device 10 (10A), the hook portions 38a of the engaging members 38 (80) have the hook-side inclined surfaces 38c which incline toward the distal ends thereof and which can engage with the hole-side inclined surfaces 14f of the engaging hole 14d. Thus, in the engaging members 38 (80), the hook-side inclined surfaces 38c engage with the engaging hole 14d by being locked on the hole-side inclined surfaces 14f. In other words, the engaging members 38 (80) engage with the engaging hole 14d at the thick portion of the outer wall 14e of the portable information apparatus 12A (12B). In the portable information apparatuses 12A (12B), therefore, the depth of the engaging hole 14d can be further decreased or an electronic component, such as a board, can be disposed directly above the engaging hole 14d, thus making it possible to further reduce the thickness and the size of the apparatus chassis 14. The engaging members 38 (80) may be configured to engage with the engaging hole 14d by entering in the apparatus chassis 14 rather than engaging with the side wall portion of the engaging hole 14d.

Obviously, the present invention is not limited to the embodiments described above and can be freely changed or modified within the spirit of the present invention.

The foregoing embodiments have illustrated the configurations in which the engaging members 38, 80 and the engaging hole 14d engage with each other, opposing in the vertical direction. Alternatively, however, the engaging members 38 and the engaging hole 14d may be configured to engage with each other, opposing in, for example, the horizontal direction. In this case, for example, the engaging members 38, 80 may be provided, next to the connector 26, on the wall section 48a of the connecting mechanism unit 36, and the engaging hole 14d may be provided, next to the connection terminal 24, in the side surface 14a. In a substantially similar manner, the connector 26 may be provided on the upper surface 34c of the mounting base 34a, and the connection terminal 24 may be provided on the bottom surface 14b.

As has been described, the present invention provides an improved docking device capable of firmly coupling to a portable information apparatus.

While the invention has been particularly shown and described with reference to a preferred embodiment, it will be understood by those skilled in the art that various changes in form and detail may be made therein without departing from the spirit and scope of the invention.

What is claimed is:

1. A docking device comprising:
    a device chassis having an apparatus mounting section for receiving a portable information apparatus;
    an engaging member projects from a surface of said device chassis, which has a hook portion that can engage with and disengage from an engaging hole of said portable information apparatus, and which is movable between an engagement position at which said hook portion engages with said engaging hole and a disengagement position at which said engagement of said hook portion with said engaging hole is released, wherein said engaging member has a distal end portion provided with said hook portion and a proximal end portion on the opposite side from said distal end portion, and said hook portion pivots between said engagement position and said disengagement position by said proximal end portion being pivotably supported inside said device chassis; and
    a restricting member movable between a retraction position at which said engaging member is allowed to move from said engagement position to said disengagement position and a restriction position at which the movement of said engaging member from said engagement position to said disengagement position is restricted by coming in contact with said engaging member at a rear surface of said hook portion, wherein said rear surface of said hook portion of said engaging member has an inclined surface which gradually inclines toward said hook portion in a direction in which said engaging member projects, wherein said restricting member has a contact surface that inclines such that said contact surface gradually becomes wider in the direction in which said engaging member projects and which comes in contact with said inclined surface of said engaging member at said restriction position.

2. The docking device of claim 1, wherein said restricting member moves in a direction along said surface of said device chassis, which is a direction orthogonal to said direction in which said engaging member projects.

3. The docking device of claim 1, wherein said restricting member is placed at a position where said restricting member projects from said surface of said device chassis at least at said restriction position.

4. The docking device of claim 1, further comprising an elastic member that urges said engaging member toward said disengagement position from said engagement position, wherein said engaging member moves from said disengagement position to said engagement position against an urging force of said elastic member by being pressed by said restricting member that moves from said retraction position to said restriction position.

5. The docking device of claim 1, wherein said engaging member is provided in a pair, wherein said pair of engaging members being disposed with said rear surfaces of said hook portions thereof facing against each other, and said restricting member is disposed between said pair of engaging members at said restriction position and simultaneously restricts the movements of said pair of engaging members from said engagement position to said disengagement position.

6. The docking device of claim 1, wherein said engaging member engages with and disengages from said engaging hole formed in a bottom surface of said portable information apparatus by said hook portion being provided at a position where said hook portion projects from an upper surface of said apparatus mounting section and also advances and retracts with respect to a bottom surface of said portable information apparatus from said upper surface of said apparatus mounting section.

7. The docking device of claim 6, further comprising
    a detector detects a clearance between said upper surface of said apparatus mounting section and said bottom surface of said portable information apparatus placed on said apparatus mounting section; and
    a position adjusting mechanism moves said engaging member towards or away from said engaging hole on the basis of a detection result of the clearance obtained by said detector so as to adjust the position of said hook portion such that said hook portion engages with said engaging hole.

8. The docking device of claim 7, wherein said detector has an ascending/descending member that ascends and descends by being pressed by said bottom surface of said portable information apparatus placed on said apparatus mounting section.

9. The docking device of claim 8, wherein said position adjusting mechanism has an interlocking member that interlocks an ascending/descending operation of said ascending/descending member with an advancing/retracting operation of said engaging member.

10. A docking device comprising:
    a device chassis having an apparatus mounting section on which a portable information apparatus is to be placed;
    an engaging member projects from a surface of said device chassis, which has a hook portion that can engage with and disengage from an engaging hole of said portable information apparatus, and which is movable between an engagement position at which a hook portion engages with said engaging hole and a disengagement position at which the engagement of said hook portion with said engaging hole is released, wherein said engaging member has a distal end portion provided with said hook portion and a proximal end portion on the opposite side from said distal end portion, and said hook portion pivots between said engagement position and said disengagement position by said proximal end portion being pivotably supported inside said device chassis; and
    a restricting member movable between a retraction position at which said engaging member is allowed to move from said engagement position to said disengagement position and a restriction position at which the movement of said engaging member from said engagement position to said disengagement position is restricted by projecting from said surface of said device chassis and coming in contact with said engaging member at a rear surface of said hook portion.

11. The docking device of claim 10, further comprising an elastic member that urges said engaging member toward said disengagement position from said engagement position, wherein said engaging member moves from said disengagement position to said engagement position against an urging force of said elastic member by being pressed by said restricting member that moves from said retraction position to said restriction position.

12. The docking device of claim 10, wherein said engaging member is provided in a pair, wherein said pair of engaging members being disposed with said rear surfaces of said hook portions thereof facing against each other, and said restricting member is disposed between said pair of engaging members at said restriction position and simultaneously restricts the movements of said pair of engaging members from said engagement position to said disengagement position.

13. A docking device comprising:
a device chassis having an apparatus mounting section on which a portable information apparatus is to be placed;
an engaging member projects from a surface of said device chassis, which has a hook portion that can engage with and disengage from an engaging hole of said portable information apparatus, and which is movable between an engagement position at which a hook portion engages with said engaging hole and a disengagement position at which the engagement of said hook portion with said engaging hole is released, wherein said engaging member engages with and disengages from said engaging hole formed in a bottom surface of said portable information apparatus by said hook portion being provided at a position where said hook portion projects from an upper surface of said apparatus mounting section and also advances and retracts with respect to a bottom surface of said portable information apparatus from said upper surface of said apparatus mounting section; and
a restricting member movable between a retraction position at which said engaging member is allowed to move from said engagement position to said disengagement position and a restriction position at which the movement of said engaging member from said engagement position to said disengagement position is restricted by projecting from said surface of said device chassis and coming in contact with said engaging member at a rear surface of said hook portion.

14. The docking device of claim 13, further comprising
a detector detects a clearance between said upper surface of said apparatus mounting section and said bottom surface of said portable information apparatus placed on said apparatus mounting section; and
a position adjusting mechanism moves said engaging member towards or away from said engaging hole on the basis of a detection result of the clearance obtained by said detector so as to adjust the position of said hook portion such that said hook portion engages with said engaging hole.

15. The docking device of claim 14, wherein said detector has an ascending/descending member that ascends and descends by being pressed by said bottom surface of said portable information apparatus placed on said apparatus mounting section.

16. The docking device of claim 15, wherein said position adjusting mechanism has an interlocking member that interlocks an ascending/descending operation of said ascending/descending member with an advancing/retracting operation of said engaging member.

17. A docking device comprising:
a device chassis having an apparatus mounting surface on which a portable information apparatus is to be placed;
a pair of engaging members projecting from said apparatus mounting surface, wherein said pair of engaging members is movable between an engagement position at which said pair of engaging members is engaged with an engaging hole of said portable information apparatus, and a disengagement position at which said pair of engaging members is released from said engaging hole of said portable information apparatus;
a restricting member movable between a retraction position to place said pair of engaging members in said disengagement position, and a restriction position to place said pair of engaging members in said engagement position; and
an operating level for placing said restricting member in one of said retraction position and said disengagement position.

18. The docking device of claim 17, wherein said restricting member is located between said pair of engaging members.

19. The docking device of claim 17, wherein said pair of engaging members include a distal end portion provided with a hook portion and a proximal end portion on the opposite side from said distal end portion, and said hook portion pivots between said engagement position and said disengagement position by said proximal end portion being pivotably supported inside said device chassis.

* * * * *